(12) United States Patent
Hannuksela

(10) Patent No.: US 9,479,775 B2
(45) Date of Patent: Oct. 25, 2016

(54) METHOD AND APPARATUS FOR VIDEO CODING

(71) Applicant: Nokia Technologies Oy, Espoo (FI)

(72) Inventor: Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 543 days.

(21) Appl. No.: 13/757,529

(22) Filed: Feb. 1, 2013

(65) Prior Publication Data

US 2013/0194384 A1    Aug. 1, 2013

Related U.S. Application Data

(60) Provisional application No. 61/593,519, filed on Feb. 1, 2012.

(51) Int. Cl.
| | |
|---|---|
| *H04N 7/26* | (2006.01) |
| *H04N 19/50* | (2014.01) |
| *H04N 19/70* | (2014.01) |
| *H04N 19/30* | (2014.01) |

(Continued)

(52) U.S. Cl.
CPC ........ *H04N 19/00569* (2013.01); *H04N 19/30* (2014.11); *H04N 19/463* (2014.11); *H04N 19/70* (2014.11); *H04N 19/597* (2014.11)

(58) Field of Classification Search
CPC ............................................... H04N 19/00569
USPC ........................................................ 348/43
See application file for complete search history.

(56) References Cited

U.S. PATENT DOCUMENTS

| | | | |
|---|---|---|---|
| 2005/0190774 A1* | 9/2005 | Wiegand | H04L 29/06027 370/395.64 |
| 2009/0175349 A1* | 7/2009 | Ye | H04N 19/70 375/240.23 |

(Continued)

FOREIGN PATENT DOCUMENTS

| | | |
|---|---|---|
| CN | 101283599 A | 10/2008 |
| CN | 101374243 A | 2/2009 |

(Continued)

OTHER PUBLICATIONS

International Preliminary Report on Patentability/Written Opinion for Application No. PCT/FI2013/050103 dated Aug. 5, 2014.

(Continued)

*Primary Examiner* — Christopher S Kelley
*Assistant Examiner* — Jonathan Messmore
(74) *Attorney, Agent, or Firm* — Alston & Bird LLP

(57) ABSTRACT

There is provided a slice header prediction method and apparatuses for 3D video encoding and decoding. In some example embodiments the following features can be derived from the header prediction method. Any decoding order of texture and depth view components may be supported. Also flexible prediction of syntax elements from any slice header appearing earlier in decoding order within the same access unit is allowed. The prediction can be turned on or off on view component basis. The syntax elements of the slice header may be categorized in a few sets and the use of the prediction as well as the prediction source for each set can be individually controlled. By using some example embodiments of the method all syntax elements of the slice header may be predicted.

19 Claims, 10 Drawing Sheets

(51) Int. Cl.
*H04N 19/463* (2014.01)
*H04N 19/597* (2014.01)

(56) References Cited

U.S. PATENT DOCUMENTS

| | | |
|---|---|---|
| 2010/0158129 A1 | 6/2010 | Lai et al. |
| 2010/0158135 A1* | 6/2010 | Yin .................. H04N 19/70 375/240.26 |
| 2010/0284466 A1 | 11/2010 | Pandit et al. |
| 2012/0014454 A1 | 1/2012 | Budagavi et al. |
| 2013/0022113 A1 | 1/2013 | Chen et al. |
| 2013/0188709 A1* | 7/2013 | Deshpande .......... H04N 19/70 375/240.13 |
| 2015/0042753 A1 | 2/2015 | Hattori et al. |

FOREIGN PATENT DOCUMENTS

| | | |
|---|---|---|
| CN | 102055982 A | 5/2011 |
| JP | 2010-520697 A | 6/2010 |
| JP | 2010-157821 A | 7/2010 |
| JP | 2010-537484 A | 12/2010 |
| JP | 2011-509631 A | 3/2011 |
| JP | WO2013/115025 A1 | 5/2015 |
| WO | WO 2007/047077 A2 | 4/2007 |
| WO | WO 2008/108566 A1 | 9/2008 |
| WO | WO 2009/136681 A1 | 11/2009 |
| WO | WO 2010/043773 A1 | 4/2010 |
| WO | WO 2010/126608 A2 | 11/2010 |
| WO | WO 2013/016225 A1 | 1/2013 |
| WO | WO 2013/016231 A1 | 1/2013 |

OTHER PUBLICATIONS

International Search Report for Application No. PCT/FI2013/050103 dated May 23, 2013.
Sjoberg, R. et al., *Overview of HEVC High-Level Syntax and Reference Picture Management*, IEEE Transactions on Circuits and Systems for Video Technology, vol. 22, No. 12 (Dec. 2012) 1858-1870.
Sullivan, G. J. et al., *Overview of the High Efficiency Video Coding (HEVC) Standard*, IEEE Transactions on Circuits and Systems for Video Technology, vol. 22, No. 12 (Dec. 2012) 1649-1668.
Wenger, S. et al., *RTP Payload Format for Scalable Video Coding*, RFC 6190, (May 2011) 1-100.
Office Action for Chinese Application No. 2013800163572 dated Feb. 3, 2016.
Office Action for corresponding Korean Application No. 10-2014-7024386 dated Sep. 9, 2015, 5 pages.
Office Action for Canadian Application No. 2,863,131 dated Oct. 27, 2015.
Office Action for Japanese Application No. 2014-555275 dated Oct. 15, 2015.
Choi, B. et al., *On Slice Header and Parameter Set*, Joint Collaborative Team on 3D Video Coding Extension Development of ITU-T SG 16 WP 3 and ISO/IEC JTC 1/SC 29/WG 11, 1$^{st}$ Meeting, Stockholm, SE (Jul. 2012) JCT2-A0026, pp. 1-3.
Hannuksela, M. M. et al., *Nested Hierarchy of Tiles and Slices Through Slice Header Prediction*, Joint Collaborative Team on Video Coding (JCT-VC) of ITU-T SG 16 WP 3 and ISO/IEC JTC 1/SC 29/WG 11, 9$^{th}$ Meeting, Geneva, CH (Apr. 2012), JCTVC-I0070r2, pp. 1-11.
Misra, K. et al., *Lightweight Slicing for Entropy Coding*, Collaborative Team on Video Coding (JCT-VC) of ITU-T SG16 WP3 and ISO/IEC JTC1/SC29/WG11, 4$^{th}$ Meeting, Daegu, KR, (Jan. 16, 2011), JCTVC-D070 pp. 1-7.
Misra, K. et al., *Tiles for Parallel Decoding*, Joint Collaborative Team on Video Coding (JCT-VC) of ITU-T SG16 WP3 and ISO/IEC JTC1/SC29/WG11, 5$^{th}$ Meeting: Geneva, CH, Mar. 19, 2011) JCTVC-E412_r1, pp. 1-5.
Tsai, C-Y, et al., *CE4 Subset3: Slice Common Information Sharing*, Joint Collaborative Team on Video Coding (JCT-VC) of ITSU-T SG16 WP3 and ISO/IEC JTC1/SC29/WG11, 5$^{th}$ Meeting, Geneva, CH (Mar. 2011) JCTVC-E045_rl, pp. 1-7.
Wenger, S. et al., *Adaptation Parameter Set (APS)*, Joint Collaborative Team on Video Coding (JCT-VC) of ITU-T SG16 WP3 and ISO/IEC JTC1/SC29/WG11, 6$^{th}$ Meeting: Torino, IT (Jul. 2011), JCTVC-F747r3, pp. 1-10.

* cited by examiner

METHOD AND APPARATUS FOR VIDEO CODING

TECHNICAL FIELD

The present application relates generally to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

Several technologies for view rendering are available, and for example, depth image-based rendering (DIBR) has shown to be a competitive alternative. A typical implementation of DIBR takes stereoscopic video and corresponding depth information with stereoscopic baseline as input and synthesizes a number of virtual views between the two input views. Thus, DIBR algorithms may also enable extrapolation of views that are outside the two input views and not in between them. Similarly, DIBR algorithms may enable view synthesis from a single view of texture and the respective depth view.

Some video coding standards introduce headers at slice layer and below, and a concept of a parameter set at layers above the slice layer. An instance of a parameter set may include all picture, group of pictures (GOP), and sequence level data such as picture size, display window, optional coding modes employed, macroblock allocation map, and others. Each parameter set instance may include a unique identifier. Each slice header may include a reference to a parameter set identifier, and the parameter values of the referred parameter set may be used when decoding the slice. Parameter sets decouple the transmission and decoding order of infrequently changing picture, GOP, and sequence level data from sequence, GOP, and picture boundaries. Parameter sets can be transmitted out-of-band using a reliable transmission protocol as long as they are decoded before they are referred. If parameter sets are transmitted in-band, they can be repeated multiple times to improve error resilience compared to conventional video coding schemes. The parameter sets may be transmitted at a session set-up time. However, in some systems, mainly broadcast ones, reliable out-of-band transmission of parameter sets may not be feasible, but rather parameter sets are conveyed in-band in Parameter Set NAL units.

SUMMARY

According to some example embodiments of the present invention there is provided a slice header prediction method and apparatuses for 3D video encoding and decoding. In some example embodiments the following features can be derived from the header prediction method. Any decoding order of texture and depth view components may be supported. Also flexible prediction of syntax elements from any slice header appearing earlier in decoding order within the same access unit is allowed. The prediction can be turned on or off on view component basis. The syntax elements of the slice header may be categorized in a few sets and the use of the prediction as well as the prediction source for each set can be individually controlled. By using some example embodiments of the method all syntax elements of the slice header may be predicted.

In some example embodiments the slice header prediction tool can be summarized as follows. Syntax elements of slice headers are grouped into group of slices (GOS) parameter sets. GOS parameter sets may be valid at maximum for an access unit. GOS parameter sets specified for an access unit may be made. The slice header of the texture view component of the base view implicitly forms GOS parameter set. GOS parameter sets may be included in-line in the bitstream.

In some example embodiments the GOS parameter set contains three types of syntax elements or structures. The GOS parameter set may contain syntax structures that may be copied from an identified GOS parameter set. These syntax structures include reference picture list modification, prediction weight table, and decoded reference picture marking. The GOS parameter set may also contain syntax structures that remain unchanged for an entire view component. The GOS parameter set may optionally contain syntax structures that remain unchanged for the entire access unit.

A GOS parameter set may inherit syntax structures from more than one other GOS parameter set. For example, reference picture list modification may be inherited from one GUS parameter set, while decoded reference picture marking may be inherited from another GOS parameter set.

GOS parameter sets may be repeated. If they are repeated for each slice, the same error robustness as having a full slice header may be obtained.

Various aspects of examples of the invention are set out in the claims.

According to a first aspect of the present invention, there is provided a method comprising:

encoding an uncompressed picture into a coded picture comprising a slice, the encoding comprising:

classifying syntax elements for the slice into a first set and a second set;

determining syntax element values for the first set and the second set;

encoding the first set selectively in a first group of slices parameter set or a slice header, wherein said encoding comprising one of the following:

providing an indication of an inclusion of the respective first set from another group of slices parameter set; or encoding the syntax element values of the first set; or omitting both of the above; and encoding the second set selectively in a second group of slices parameter set or the slice header, wherein said encoding comprising one of the following:

providing an indication of an inclusion of the respective second set from another group of slices parameter set; or encoding the syntax element values of the second set; or omitting both of the above.

According to a second aspect of the present invention, there is provided an apparatus comprising at least one processor and at least one memory including computer program code, the at least one memory and the computer program code configured to, with the at least one processor, cause the apparatus to:

classify syntax elements for a slice of a coded picture comprising into a first set and a second set;

determine syntax element values for the first set and the second set;

encode the first set selectively in a first group of slices parameter set or a slice header comprising one of the following:

providing an indication of an inclusion of the respective first set from another group of slices parameter set; or encoding the syntax element values of the first set; or omitting both of the above; and encode the second set selectively in a second group of slices parameter set or the slice header comprising one of the following:

providing an indication of an inclusion of the respective second set from another group of slices parameter set; or encoding the syntax element values of the second set; or omitting both of the above.

According to a third aspect of the present invention, there is provided a computer program product including one or more sequences of one or more instructions which, when executed by one or more processors, cause an apparatus to at least perform the following:

classify syntax elements for a slice of a coded picture comprising into a first set and a second set;

determine syntax element values for the first set and the second set;

encode the first set selectively in a first group of slices parameter set or a slice header comprising one of the following:

providing an indication of an inclusion of the respective first set from another group of slices parameter set; or encoding the syntax element values of the first set; or omitting both of the above; and encode the second set selectively in a second group of slices parameter set or the slice header comprising one of the following:

providing an indication of an inclusion of the respective second set from another group of slices parameter set; or encoding the syntax element values of the second set; or omitting both of the above.

According to a fourth aspect of the present invention, there is provided an apparatus comprising:

means for classifying syntax elements for a slice of a coded picture comprising into a first set and a second set;

means for determining syntax element values for the first set and the second set;

means for encoding the first set selectively in a first group of slices parameter set or a slice header comprising one of the following:

providing an indication of an inclusion of the respective first set from another group of slices parameter set; or encoding the syntax element values of the first set; or omitting both of the above; and means for encoding the second set selectively in a second group of slices parameter set or the slice header comprising one of the following:

providing an indication of an inclusion of the respective second set from another group of slices parameter set; or encoding the syntax element values of the second set; or omitting both of the above.

According to a fifth aspect of the present invention, there is provided a method comprising:

decoding a coded slice of a coded picture, the decoding comprising:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; and decoding the coded slice using the decoded first set and the second set of syntax elements.

According to a sixth aspect of the present invention, there is provided an apparatus comprising at least one processor and at least one memory including computer program code, the at least one memory and the computer program code configured to, with the at least one processor, cause the apparatus to:

decode a coded slice of a coded picture by:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; and decoding the coded slice using the decoded first set and the second set of syntax elements.

According to a seventh aspect of the present invention, there is provided a computer program product including one or more sequences of one or more instructions which, when executed by one or more processors, cause an apparatus to at least perform the following:

decode a coded slice of a coded picture by:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; and decoding the coded slice using the decoded first set and the second set of syntax elements.

According to an eighth aspect of the present invention, there is provided a method comprising:

decoding a coded slice of a coded picture, the decoding comprising:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decoding syntax elements of the first set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decoding syntax elements of the second set; and decoding the coded slice using the decoded first set of syntax elements and the second set of syntax elements.

According to a ninth aspect of the present invention, there is provided an apparatus comprising at least one processor and at least one memory including computer program code, the at least one memory and the computer program code configured to, with the at least one processor, cause the apparatus to:

decode a coded slice of a coded picture by:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decode syntax elements of the first set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decode syntax elements of the second set; and decoding the coded slice using the decoded first set of syntax elements and the second set of syntax elements.

According to a tenth aspect of the present invention, there is provided a computer program product including one or more sequences of one or more instructions which, when executed by one or more processors, cause an apparatus to at least perform the following:

decode a coded slice of a coded picture by:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decoding syntax elements of the first set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decoding syntax elements of the second set; and decoding the coded slice using the decoded first set of syntax elements and the second set of syntax elements.

According to an eleventh aspect of the present invention, there is provided an apparatus comprising:

means for decoding a coded slice of a coded picture, the decoding comprising:

means for identifying a first location of a first set of syntax elements and a second location of a second set of syntax elements to be used for decoding the coded slice to be one of a slice header or a group of slices parameter set, means for decoding the first set of syntax elements and the second set of syntax elements to be used for decoding the coded slice, comprising:

means for decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decoding syntax elements of the first set; and means for decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decoding syntax elements of the second set; and means for decoding the coded slice using the decoded first set of syntax elements and the second set of syntax elements.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
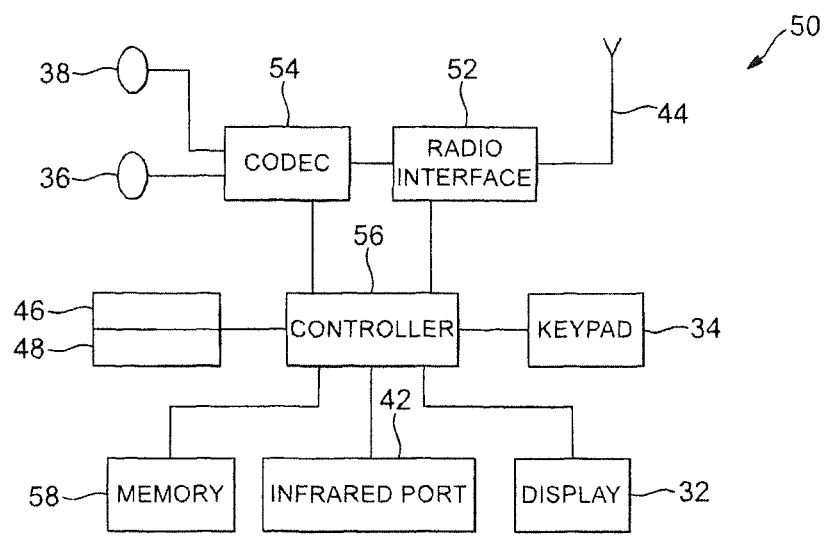
FIG. 1 shows a block diagram of a video coding system according to an example embodiment.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in the current working draft of HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC, a picture may either be a frame or a field. In the current working draft of HEVC, a picture is a frame. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In a draft HEVC standard, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In a draft HEVC standard, a picture can be partitioned in tiles, which are rectangular and contain an integer number of LCUs. In the current working draft of HEVC, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not.

NAL units consist of a header and payload. In H.264/AVC and HEVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. A draft HEVC includes a 1-bit nal_ref_idc syntax element, also known as nal_ref_flag, which when equal to 0 indicates that a coded slice contained in the NAL unit is a part of a non-reference picture and when equal to 1 indicates that a coded slice contained in the NAL unit is a part of a reference picture. The header for SVC and MVC NAL units may additionally contain various indications related to the scalability and multiview hierarchy. In HEVC, the NAL unit header includes the temporal_id syntax element, which specifies a temporal identifier for the NAL unit. The bitstream created by excluding all VCL NAL units having a temporal_id greater than or equal to a selected value and including all other VCL NAL units remains conforming. Consequently, a picture having temporal_id equal to TID does not use any picture having a temporal_id greater than TID as inter prediction reference. In a draft HEVC, the reference picture list initialization is limited to only reference picture marked as "used for reference" and having a temporal_id less than or equal to the temporal_id of the current picture.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU. In H.264/AVC and HEVC a coded slice NAL unit can be indicated to be a coded slice in an Instantaneous Decoding Refresh (IDR) picture or coded slice in a non-IDR picture. In HEVC, a coded slice NAL unit can be indicated to be a coded slice in a Clean Decoding Refresh (CDR) picture (which may also be referred to as a Clean Random Access picture).

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be essential to the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. A picture parameter set contains such parameters that are likely to be unchanged in several coded pictures.

In a draft HEVC, there is also a third type of parameter sets, here referred to as Adaptation Parameter Set (APS), which includes parameters that are likely to be unchanged in several coded slices. In a draft HEVC, the APS syntax structure includes parameters or syntax elements related to context-based adaptive binary arithmetic coding (CABAC), adaptive sample offset, adaptive loop filtering, and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS.

H.264/AVC and HEVC syntax allows many instances of parameter sets, and each instance is identified with a unique identifier. In H.264/AVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A SEI NAL unit may contain one or more SEI messages, which are not required for the decoding of output pictures but assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CDR NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of thereference pictures used for the temporal direct mode are short-term reference pictures, the motion vector used in the prediction may be scaled according to the picture order count (POC) difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-tei in indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC, reference picture marking syntax structures and related decoding processes have been replaced with a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set. A reference picture set may be specified in a picture parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and is not needed for output.

In many coding modes of H.264/AVC and HEVC, the reference picture for inter prediction is indicated with an index to a reference picture list. The index is coded with CABAC or variable length coding. In general, the smaller the index is, the shorter the corresponding syntax element may become. Two reference picture lists (reference picture list 0 and reference picture list 1) are generated for each bi-predictive (B) slice, and one reference picture list (reference picture list 0) is formed for each inter-coded (P) slice.

Typical high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU comprises 1) The information whether 'the PU is uni-predicted using only reference picture list0' or 'the PU is uni-predicted using only reference picture list1' or 'the PU is bi-predicted using both reference picture list0 and list 1' 2) Motion vector value corresponding to the reference picture list0 3) Reference picture index in the reference picture list0 4) Motion vector value corresponding to the reference picture list1 5) Reference picture index in the reference picture list1. Similarly, predicting the motion information is carried out using the motion information of adjacent blocks and/or co-located blocks in temporal reference pictures. Typically, a list, often called as a merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as an inter-merge mode.

A reference picture list, such as reference picture list 0 and reference picture list 1, may be constructed in two steps: First, an initial reference picture list is generated. The initial reference picture list may be generated for example on the basis of frame_num, POC, temporal_id, or information on the prediction hierarchy such as a GOP structure, or any combination thereof. Second, the initial reference picture list may be reordered by reference picture list reordering (RPLR) commands, also known as reference picture list modification syntax structure, contained in slice headers. The RPLR commands indicate the pictures that are ordered to the beginning of the respective reference picture list. This second step may also be referred to as the reference picture list modification process and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

The merge list may be generated on the basis of reference picture list 0 and/or reference picture list 1 for example using the reference picture lists combination syntax structure included in the slice header syntax. There may be a reference picture lists combination syntax structure, created into the bitstream by an encoder and decoded from the bitstream by a decoder, which indicates the contents of the merge list. The syntax structure may indicate that the reference picture list 0 and the reference picture list 1 are combined to be an additional reference picture lists combination used for the prediction units being uni-directional predicted. The syntax structure may include a flag which, when equal to a certain value, indicates that the reference picture list 0 and reference picture list 1 are identical thus reference picture list 0 is used as the reference picture lists combination. The syntax structure may include a list of entries, each specifying a reference picture list (list 0 or list 1) and a reference index to the specified list, where an entry specifies a reference picture to be included in the merge list.

A syntax structure for decoded reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

A reference picture lists syntax structure may include three parts, reference picture list 0 description for P and B slices, reference picture list 1 description for B slices, and idle reference picture list description for any slices including those reference pictures that are not included in either reference picture list 0 or 1 but are still to be kept marked as "used for reference". In other words, there may e.g. be one syntax structure (instead of more than one) that provides the information for both reference picture marking and reference picture list construction.

When the decoding of a slice starts, the reference picture lists syntax structure may be parsed. For P and B slices, the syntax structure includes a reference picture list description for list 0, which is decoded. The reference picture list description syntax structure may list pictures identified by their picture order count (POC) value in the order they appear in the reference picture list. For B slices, the reference picture lists syntax structure may include a reference picture list description for list 1, which is decoded.

A reference picture list initialization process and/or reference picture list modification process may be omitted, and the reference picture lists may be directly described in the syntax structures.

Additionally or instead, the reference picture lists syntax structure may include a reference picture list description for an idle reference picture list, which, if present, is decoded.

Pictures that are in any of the reference picture lists may be marked as "used for reference". Pictures that are in no reference picture list may be marked as "unused for reference".

In other words, a reference picture list construction and reference picture marking processes and syntax structures may be handled in a single unified process and syntax structure.

It is noted that even though the reference pictures in the idle reference picture list have a specified order determined by the reference picture list description syntax structure, there are usually no specific requirements in which order the encoder should list the idle reference pictures. In some sense, the idle reference picture list may often be considered an unordered list or a set.

Reference picture list 0 and list 1 may contain reference pictures that are indicated to be unused for reference for the current slice. For example, a reference index beyond num_ref_idx_l0_active_minus1 may not be used for reference for the current slice. It may be specified that such non-referenced reference pictures in reference picture list 0 and list 1 are marked as "used for reference". Alternatively, it may be specified that if a reference picture is only included as a non-referenced reference picture in list 0 or list 1 and not in the idle reference picture list or as a referenced reference picture in list 0 or list 1 it is marked as "unused for reference". Alternatively, the desired marking rule between the two above-mentioned ones or any other deterministic marking rule may be controlled by the encoder and indicated in the bitstream for example in the sequence parameter set SPS syntax. Including a reference picture as a non-reference picture in list 0 or list 1 may be preferred over including it in the idle reference picture list for example if fewer bits are consumed in encoding.

In scalable video coding, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_lx_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

In scalable multiview coding, the same bitstream may contain coded view components of multiple views and at least some coded view components may be coded using quality and/or spatial scalability.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

Depth-enhanced video may be coded in a manner where texture and depth are coded independently of each other. For example, texture views may be coded as one MVC bitstream and depth views may be coded as another MVC bitstream. Alternatively depth-enhanced video may be coded in a manner where texture and depth are jointly coded. When joint coding texture and depth views is applied for a depth-enhanced video representation, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture.

It has been found that a solution for some multiview 3D video (3DV) applications is to have a limited number of input views, e.g. a mono or a stereo view plus some supplementary data, and to render (i.e. synthesize) all required views locally at the decoder side. From several available technologies for view rendering, depth image-based rendering (DIBR) has shown to be a competitive alternative.

Figure 5:
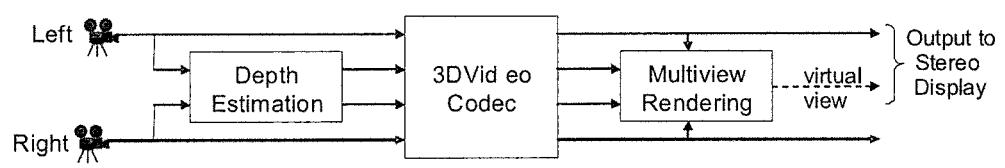
FIG. 5 shows a simplified model of a DIBR-based 3DV system.

A simplified model of a DIBR-based 3DV system is shown in FIG. 5. The input of a 3D video codec comprises a stereoscopic video and corresponding depth information with stereoscopic baseline b0. Then the 3D video codec synthesizes a number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for each video frame. A depth map is an image with per-pixel depth information. Each sample in a depth map represents the distance of the respective texture sample from the plane on which the camera lies. In other words, if the z axis is along the shooting axis of the cameras (and hence orthogonal to the plane on which the cameras lie), a sample in a depth map represents the value on the z axis.

Figure 6:
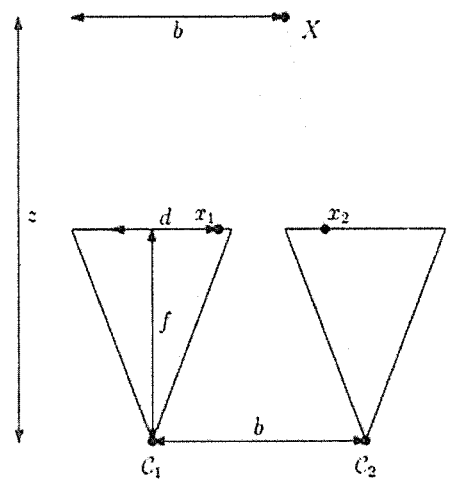
FIG. 6 shows a simplified 2D model of a stereoscopic camera setup.

Depth information can be obtained by various means. For example, depth of the 3D scene may be computed from the disparity registered by capturing cameras. A depth estimation algorithm takes a stereoscopic view as an input and computes local disparities between the two offset images of the view. Each image is processed pixel by pixel in overlapping blocks, and for each block of pixels a horizontally localized search for a matching block in the offset image is performed. Once a pixel-wise disparity is computed, the corresponding depth value z is calculated by equation (1):

$$z = \frac{f \cdot b}{d + \Delta d}, \quad (1)$$

where f is the focal length of the camera and b is the baseline distance between cameras, as shown in FIG. 6. Further, d refers to the disparity observed between the two cameras, and the camera offset Δd reflects a possible horizontal misplacement of the optical centers of the two cameras. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Disparity or parallax maps, such as parallax maps specified in ISO/IEC International Standard 23002-3, may be processed similarly to depth maps. Depth and disparity have a straightforward correspondence and they can be computed from each other through mathematical equation.

Figure 7:
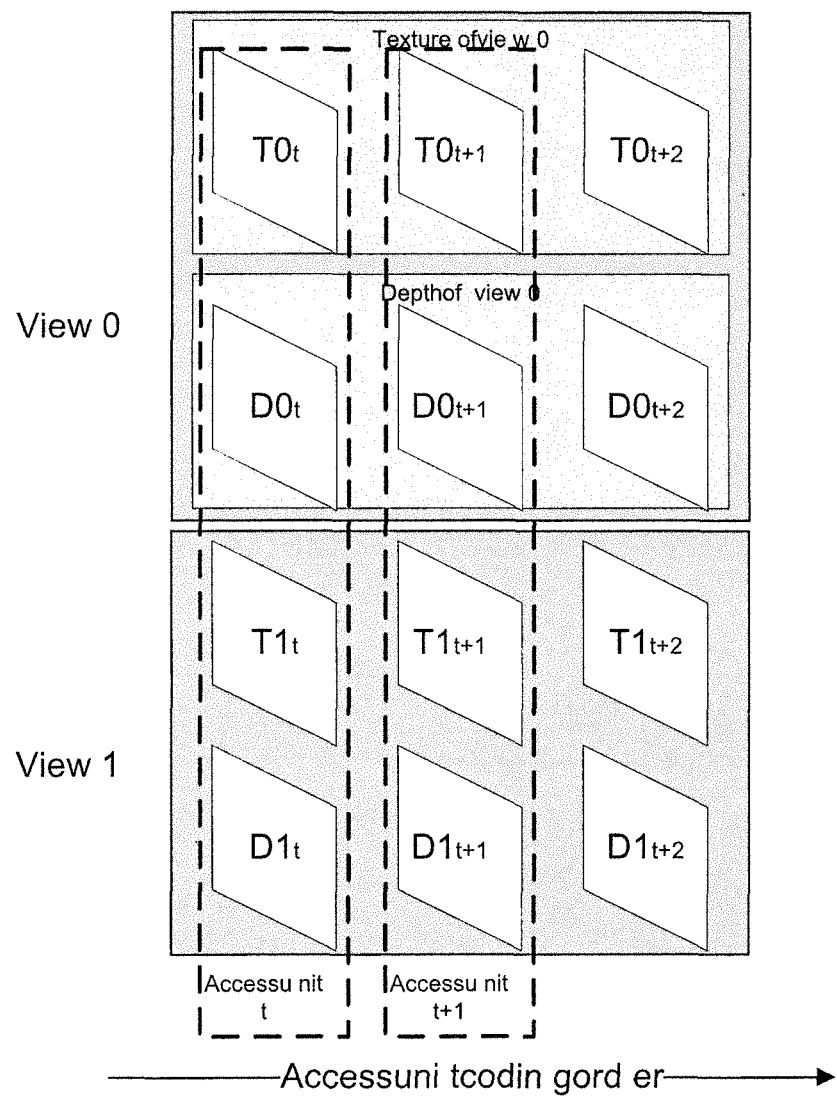
FIG. 7 shows an example of definition and coding order of access units.

The coding and decoding order of texture and depth view components within an access unit is typically such that the data of a coded view component is not interleaved by any other coded view component, and the data for an access unit is not interleaved by any other access unit in the bitstream/decoding order. For example, there may be two texture and depth views (T0$_t$, T1$_t$, T0$_{t+1}$, T1$_{t+1}$, T0$_{t+2}$, T1$_{t+2}$, D0$_t$, D1$_t$, D0$_{t+1}$, D1$_{t+1}$, D0$_{t+2}$, D1$_{t+2}$) in different access units (t, t+1, t+2), as illustrated in FIG. 7, where the access unit t consisting of texture and depth view components (T0$_t$, T1$_t$, D0$_t$, D1$_t$) precedes in bitstream and decoding order the access unit t+1 consisting of texture and depth view components (T0$_{t+1}$,T1$_{t+1}$, D0$_{t+1}$,D1$_{t+1}$).

The coding and decoding order of view components within an access unit may be governed by the coding format or determined by the encoder. A texture view component may be coded before the respective depth view component of the same view, and hence such depth view components may be predicted from the texture view components of the same view. Such texture view components may be coded for example by MVC encoder and decoder by MVC decoder. An enhanced texture view component refers herein to a texture view component that is coded after the respective depth view component of the same view and may be predicted from the respective depth view component. The texture and depth view components of the same access units are typically coded in view dependency order. Texture and depth view components can be ordered in any order with respect to each other as long as the ordering obeys the mentioned constraints.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

In this context an encoder that encodes one or more texture and depth views into a single H.264/AVC and/or MVC compatible bitstream is also called as a 3DV-ATM encoder. Bitstreams generated by such an encoder can be referred to as 3DV-ATM bitstreams. The 3DV-ATM bitstreams may include some of the texture views that H.264/AVC and/or MVC decoder cannot decode, and depth views. A decoder capable of decoding all views from 3DV-ATM bitstreams may also be called as a 3DV-ATM decoder.

3DV-ATM bitstreams can include a selected number of AVC/MVC compatible texture views. The depth views for the AVC/MVC compatible texture views may be predicted from the texture views. The remaining texture views may utilize enhanced texture coding and depth views may utilize depth coding.

Figure 8:
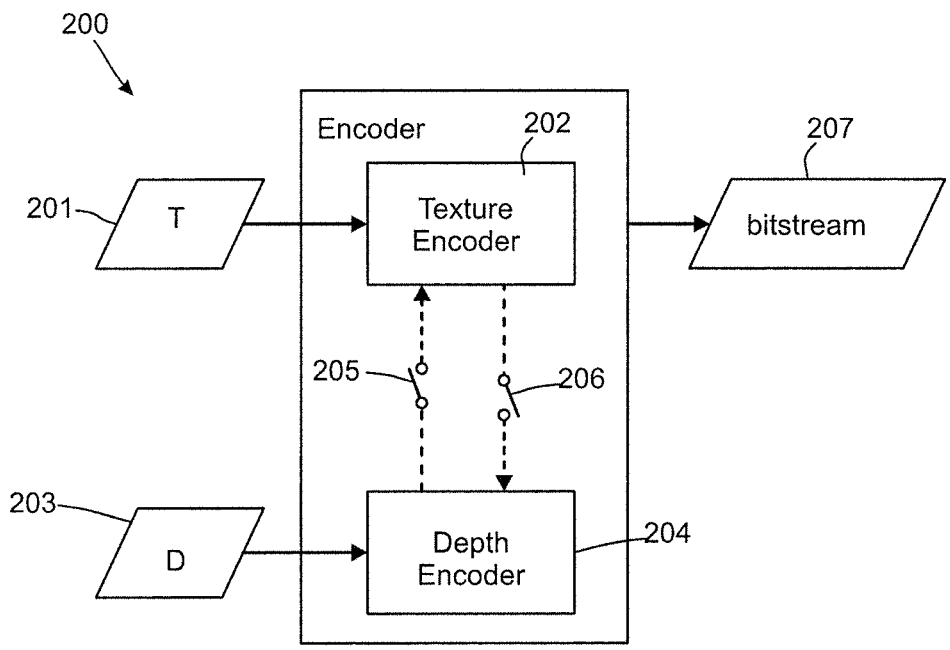
FIG. 8 shows a high level flow chart of an embodiment of an encoder capable of encoding texture views and depth views.
Figure 9:
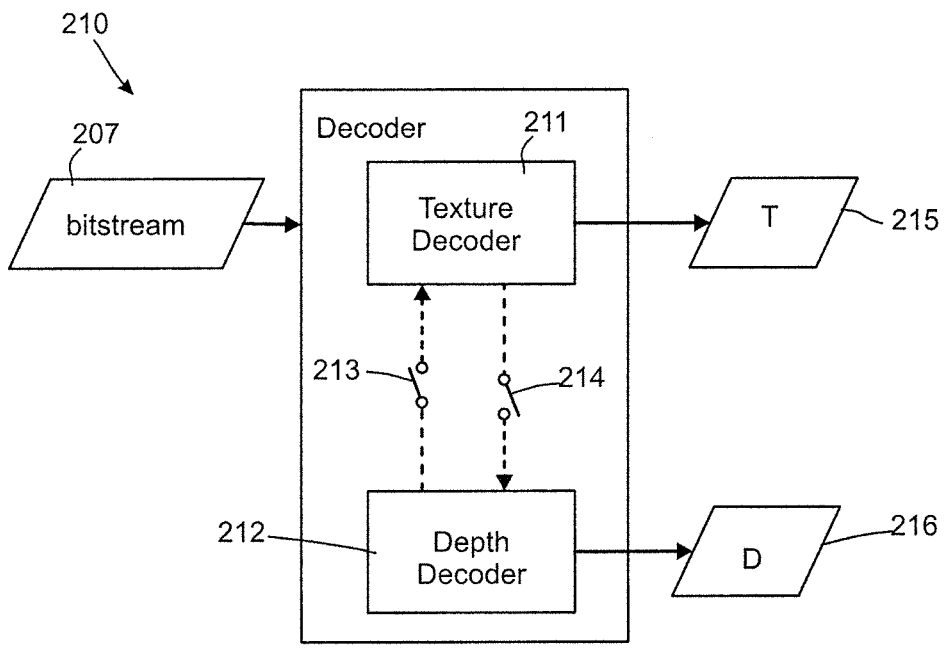
FIG. 9 shows a high level flow chart of an embodiment of a decoder capable of decoding texture views and depth views.

A high level flow chart of an embodiment of an encoder 200 capable of encoding texture views and depth views is presented in FIG. 8 and a decoder 210 capable of decoding texture views and depth views is presented in FIG. 9. On these figures solid lines depict general data flow and dashed lines show control information signaling. The encoder 200 may receive texture components 201 to be encoded by a texture encoder 202 and depth map components 203 to be encoded by a depth encoder 204. When the encoder 200 is encoding texture components according to AVC/MVC a first switch 205 may be switched off. When the encoder 200 is encoding enhanced texture components the first switch 205 may be switched on so that information generated by the depth encoder 204 may be provided to the texture encoder 202. The encoder of this example also comprises a second switch 206 which may be operated as follows. The second switch 206 is switched on when the encoder is encoding depth information of AVC/MVC views, and the second switch 206 is switched off when the encoder is encoding depth information of enhanced texture views. The encoder 200 may output a bitstream 207 containing encoded video information.

The decoder 210 may operate in a similar manner but at least partly in a reversed order. The decoder 210 may receive the bitstream 207 containing encoded video information. The decoder 210 comprises a texture decoder 211 for decoding texture information and a depth decoder 212 for decoding depth information. A third switch 213 may be provided to control information delivery from the depth decoder 212 to the texture decoder 211, and a fourth switch 214 may be provided to control information delivery from the texture decoder 211 to the depth decoder 212. When the decoder 210 is to decode AVC/MVC texture views the third switch 213 may be switched off and when the decoder 210 is to decode enhanced texture views the third switch 213 may be switched on. When the decoder 210 is to decode depth of AVC/MVC texture views the fourth switch 214 may be switched on and when the decoder 210 is to decode depth of enhanced texture views the fourth switch 214 may be switched off. The Decoder 210 may output reconstructed texture components 215 and reconstructed depth map components 216.

Many video encoders utilize the Lagrangian cost function to find rate-distortion optimal coding modes, for example the desired macroblock mode and associated motion vectors. This type of cost function uses a weighting factor or X to tie together the exact or estimated image distortion due to lossy coding methods and the exact or estimated amount of information required to represent the pixel/sample values in an image area. The Lagrangian cost function may be represented by the equation:

$$C = D\lambda R$$

where C is the Lagrangian cost to be minimised, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

Figure 2:
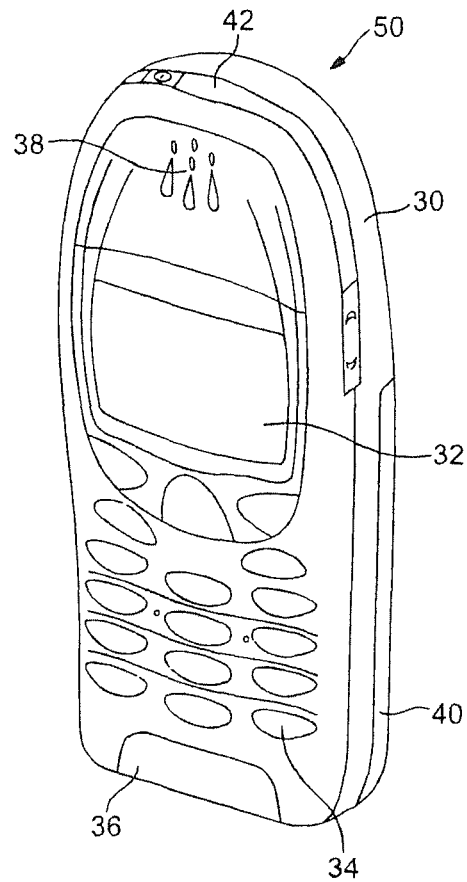
FIG. 2 shows an apparatus for video coding according to an example embodiment.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
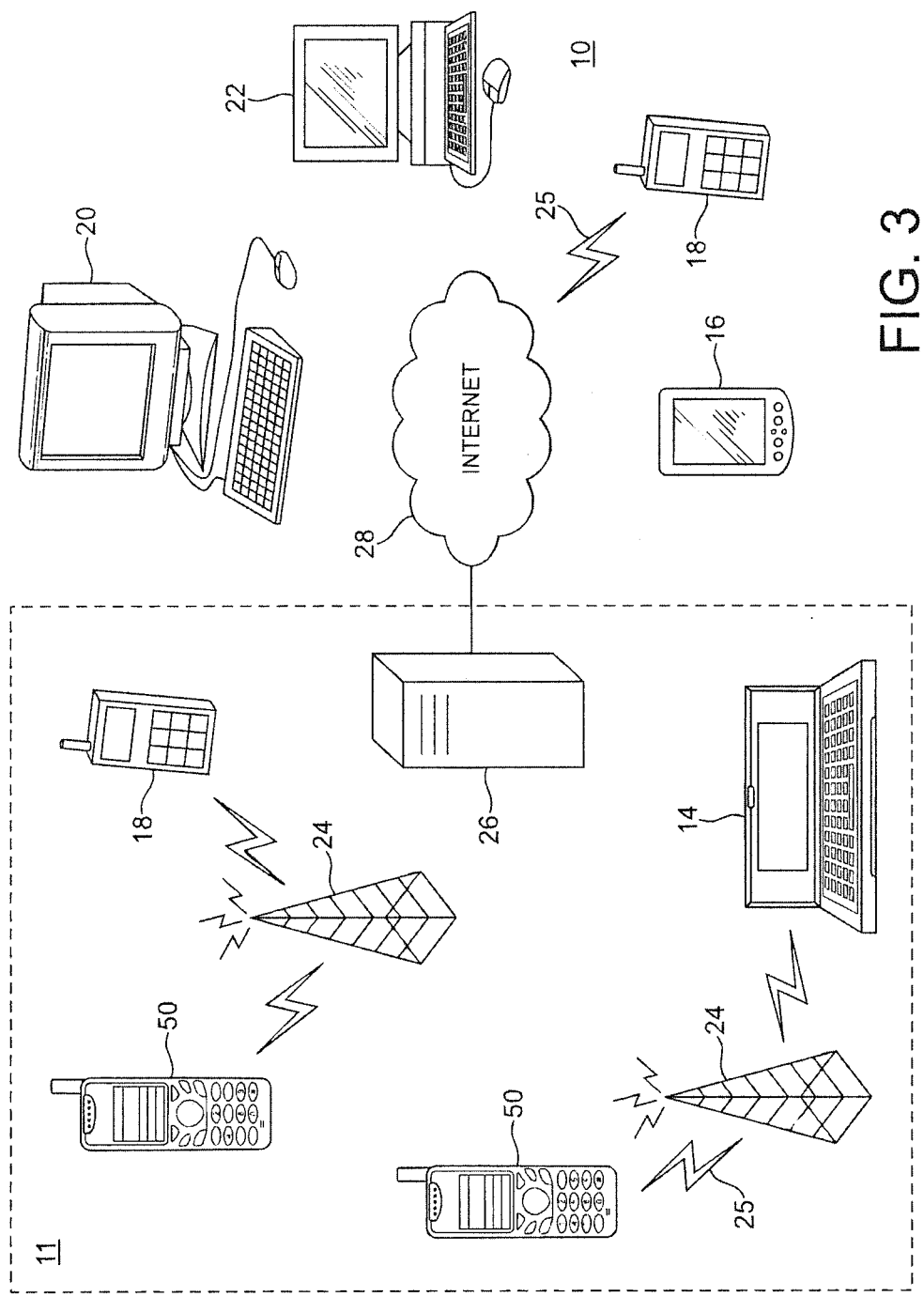
FIG. 3 shows an arrangement for video coding comprising a plurality of apparatuses, networks and network elements according to an example embodiment.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
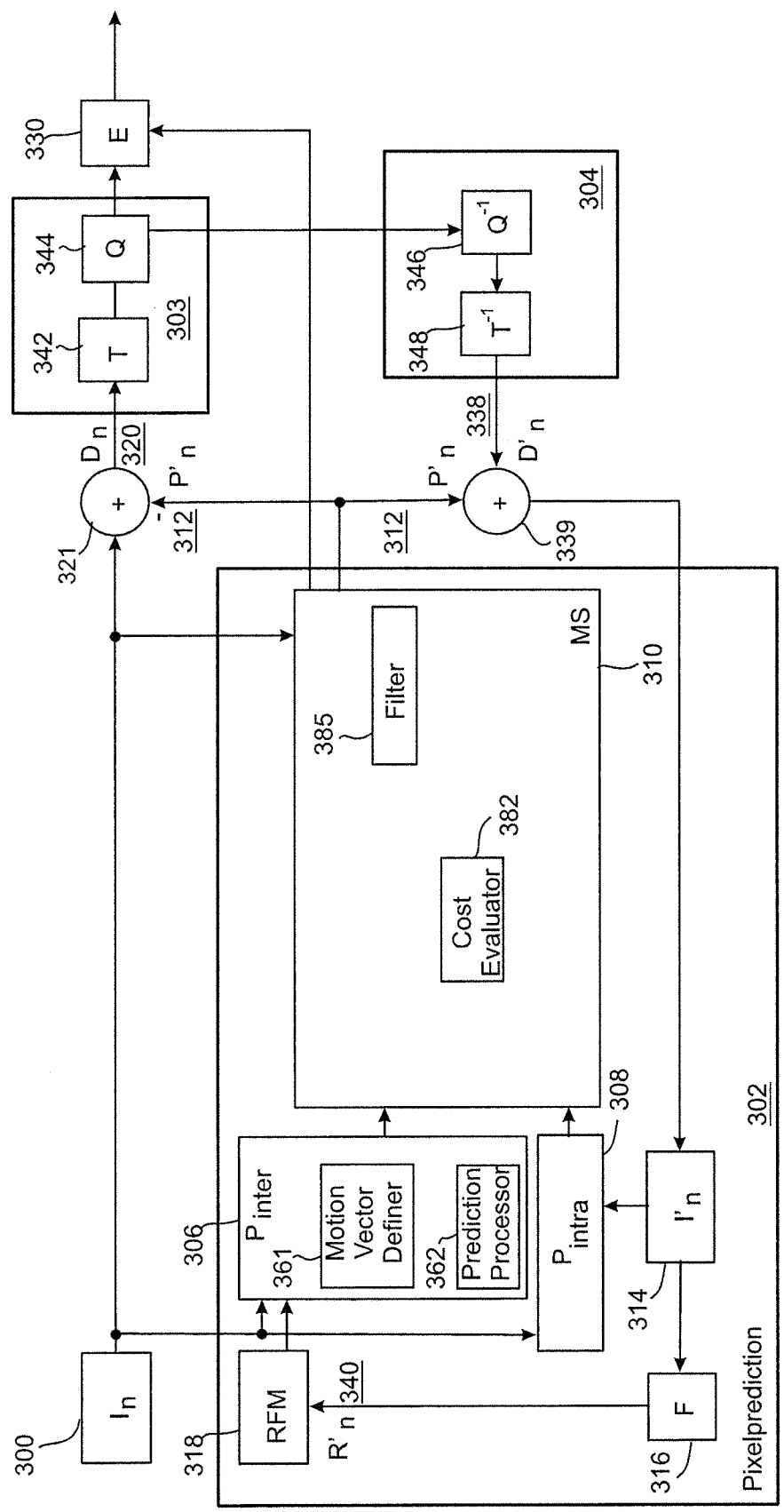
FIGS. 4a, 4b show block diagrams for video encoding and decoding according to an example embodiment.
Figure 4B:
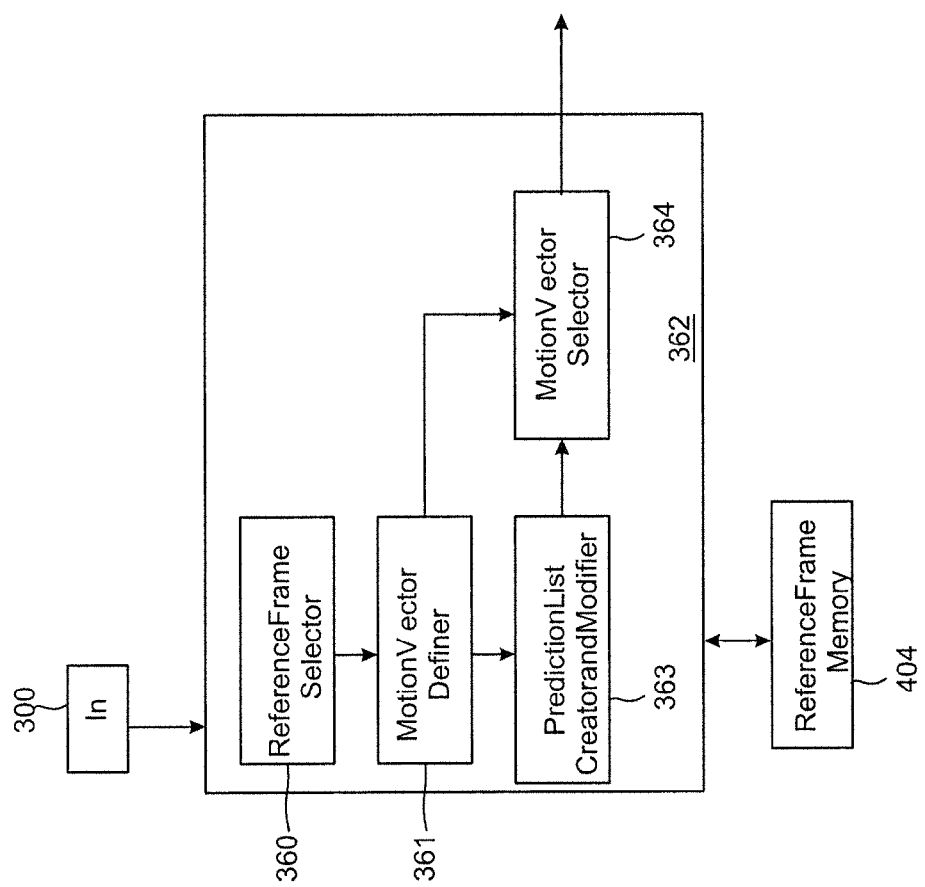

FIGS. 4a and 4b show block diagrams for video encoding and decoding according to an example embodiment.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

FIG. 4b depicts an embodiment of the inter predictor 306. The inter predictor 306 comprises a reference frame selector 360 for selecting reference frame or frames, a motion vector definer 361, a prediction list former 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of a current frame or picture). The output of both the inter-predictor and the intra-predictor are passed to the mode selector 310. Both the inter-predictor 306 and the intra-predictor 308 may have more than one intra-prediction modes. Hence, the inter-prediction and the intra-prediction may be performed for each mode and the predicted signal may be provided to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The mode selector 310 may use, in the cost evaluator block 382, for example Lagrangian cost functions to choose between coding modes and their parameter values, such as motion vectors, reference indexes, and intra prediction direction, typically on block basis. This kind of cost function uses a weighting factor lambda to tie together the (exact or estimated) image distortion due to lossy coding methods and the (exact or estimated) amount of information that is required to represent the pixel values in an image area: C=D+lambda×R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations. In many embodiments the reference frame memory 318 may be capable of storing more than one decoded picture, and one or more of them may be used by the inter-predictor 306 as reference pictures against which the future images 300 are compared in inter prediction operations. The reference frame memory 318 may in some cases be also referred to as the Decoded Picture Buffer.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in teens of 16×16 pixel macroblocks which go to form the full image or picture. However, it is noted that FIG. 4a is not limited to block size 16×16, but any block size and shape can be used generally, and likewise FIG. 4a is not limited to partitioning of a picture to macroblocks but any other picture partitioning to blocks, such as coding units, may be used. Thus, for the following examples the pixel predictor 302 outputs a series of predicted macroblocks of size 16×16 pixels and the first summing device 321 outputs a series of 16×16 pixel residual data macroblocks which may represent the difference between a first macroblock in the image 300 against a predicted macroblock (output of pixel predictor 302). The prediction error encoder 303 comprises a transform block 342 and a quantizer 344.

The transform block 342 transforms the first prediction error signal 320 to a transform domain. The transform is, for example, the DCT transform or its variant. The quantizer 344 quantizes the transform domain signal, e.g. the DCT coefficients, to form quantized coefficients.

The prediction error decoder 304 receives the output from the prediction error encoder 303 and produces a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal approximately and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives the current block for inter prediction. It is assumed that for the current block there already exists one or more neighboring blocks which have been encoded and motion vectors have been defined for them. For example, the block on the left side and/or the block above the current block may be such blocks. Spatial motion vector predictions for the current block can be formed e.g. by using the motion vectors of the encoded neighboring blocks and/or of non-neighbor blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding may be stored to the reference frame memory. Each reference frame may be included in one or more of the reference picture lists, within a reference picture list, each entry has a reference index which identifies the reference frame. When a reference frame is no longer used as a reference frame it may be removed from the reference frame memory or marked as "unused for reference" or a non-reference frame wherein the storage location of that reference frame may be occupied for a new reference frame.

Real-time Transport Protocol (RTP) is widely used for real-time transport of timed media such as audio and video. In RTP transport, media data is encapsulated into multiple RTP packets. An RTP payload format may be specified for carriage of a coded bitstream of certain format over RTP. For example, an SVC RTP payload format draft has been specified in RFC 6190 by the Internet Engineering Task Force (IETF). In SVC RTP payload format, a NAL unit type, referred to as a payload content scalability information (PACSI) NAL unit, is specified. The PACSI NAL unit, if present, is the first NAL unit in an aggregation packet containing multiple NAL units, and it is not present in other types of packets. The PACSI NAL unit indicates scalability characteristics that are common for all of the remaining NAL units in the payload, thus making it easier for a media aware network element (MANE) to decide whether to forward/process/discard the aggregation packet. Senders may create PACSI NAL units. Receivers may ignore PACSI NAL units or use them as hints to enable the efficient aggregation packet processing. When the first aggregation unit of an aggregation packet contains a PACSI NAL unit, there is at least one additional aggregation unit present in the same packet. The RTP header fields are set according to the remaining NAL units in the aggregation packet.

As described above, an access unit may contain slices of different component types (e.g. primary texture component, redundant texture component, auxiliary component, depth/disparity component), of different views, and of different scalable layers. Syntax elements that are common for one slice, e.g. syntax elements that are conventionally included in the slice header, may have the same value across different slices of the same access unit. Yet, conventionally such syntax elements are coded in each slice. In the following, different embodiments are presented to reduce the bitrate or bit count used for coding syntax elements that have the same value in multiple slices within an access unit.

In many embodiments, at least a subset of syntax elements that have conventionally been included in a slice header are included in a GOS (Group of Slices) parameter set by an encoder. An encoder may code a GOS parameter set as a NAL unit. GOS parameter set NAL units may be included in the bitstream together with for example coded slice NAL units, but may also be carried out-of-band as described earlier in the context of other parameter sets.

In many embodiments, the GOS parameter set syntax structure includes an identifier, which may be used when referring to a particular GOS parameter set instance for example from a slice header or another GOS parameter set. In some embodiments, the GOS parameter set syntax structure does not include an identifier but an identifier is inferred by both the encoder and decoder for example using the bitstream order of GUS parameter set syntax structures and a pre-defined numbering scheme.

In some embodiments, the encoder and the decoder infer the contents or the instance of GOS parameter set from other syntax structures already encoded or decoded or present in the bitstream. For example, the slice header of the texture view component of the base view may implicitly form a GOS parameter set. The encoder and decoder may infer an identifier value for such inferred GOS parameter sets. For example, the GOS parameter set formed from the slice header of the texture view component of the base view may be inferred to have identifier value equal to 0.

In some embodiments, a GOS parameter set is valid within a particular access unit associated with it. For example, if a GOS parameter set syntax structure is included in the NAL unit sequence for a particular access unit, where the sequence is in decoding or bitstream order, the GOS parameter set may be valid from its appearance location until the end of the access unit. In some embodiments, a GOS parameter set may be valid for many access units.

The encoder may encode many GOS parameter sets for an access unit. The encoder may determine to encode a GOS parameter set if it is known, expected, or estimated that at least a subset of syntax element values in a slice header to be coded would be the same in a subsequent slice header.

A limited numbering space may be used for the GOS parameter set identifier. For example, a fixed-length code may be used and may be interpreted as an unsigned integer value of a certain range. The encoder may use a GOS parameter set identifier value for a first GOS parameter set and subsequently for a second GOS parameter set, if the first GOS parameter set is subsequently not referred to for example by any slice header or GOS parameter set. The encoder may repeat a GOS parameter set syntax structure within the bitstream for example to achieve a better robustness against transmission errors.

In many embodiments, syntax elements which may be included in a GOS parameter set are conceptually collected in sets of syntax elements. A set of syntax elements for a GOS parameter set may be formed for example on one or more of the following basis:
  Syntax elements indicating a scalable layer and/or other scalability features
  Syntax elements indicating a view and/or other multiview features
  Syntax elements related to a particular component type, such as depth/disparity
  Syntax elements related to access unit identification, decoding order and/or output order and/or other syntax elements which may stay unchanged for all slices of an access unit
  Syntax elements which may stay unchanged in all slices of a view component
  Syntax elements related to reference picture list modification
  Syntax elements related to the reference picture set used
  Syntax elements related to decoding reference picture marking
  Syntax elements related to prediction weight tables for weighted prediction
  Syntax elements for controlling deblocking filtering
  Syntax elements for controlling adaptive loop filtering Syntax elements for controlling sample adaptive offset Any combination of sets above For each syntax element set, the encoder may have one or more of the following options when coding a GOS parameter set:

The syntax element set may be coded into a GOS parameter set syntax structure, i.e. coded syntax element values of the syntax element set may be included in the GOS parameter set syntax structure.

The syntax element set may be included by reference into a GOS parameter set. The reference may be given as an identifier to another GOS parameter set. The encoder may use a different reference GOS parameter set for different syntax element sets.

The syntax element set may be indicated or inferred to be absent from the GOS parameter set.

The options from which the encoder is able to choose for a particular syntax element set when coding a GOS parameter set may depend on the type of syntax element set. For example, syntax element set related to scalable layers may always be present in a GOS parameter set, while the set of syntax elements which may stay unchanged in all slices of a view component may not be available for inclusion by reference but may be optionally present in the GOS parameter set and the syntax elements related to reference picture list modification may be included by reference in, included as such in, or be absent from a GOS parameter set syntax structure. The encoder may encode indications in the bitstream, for example in a GOS parameter set syntax structure, which option was used in encoding. The code table and/or entropy coding may depend on the type of the syntax element set. The decoder may use, based on the type of the syntax element set being decoded, the code table and/or entropy decoding that is matched with the code table and/or entropy encoding used by the encoder.

The encoder may have multiple means to indicate the association between a syntax element set and the GOS parameter set used as the source for the values of the syntax element set. For example, the encoder may encode a loop of syntax elements where each loop entry is encoded as syntax elements indicating a GOS parameter set identifier value used as a reference and identifying the syntax element sets copied from the reference GOP parameter set. In another example, the encoder may encode a number of syntax elements, each indicating a GOS parameter set. The last GOS parameter set in the loop containing a particular syntax element set is the reference for that syntax element set in the GOS parameter set the encoder is currently encoding into the bitstream. The decoder parses the encoded GOS parameter sets from the bitstream accordingly so as to reproduce the same GOS parameter sets as the encoder.

In example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

In example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

In example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with most significant bit written first.

ue(v): unsigned integer Exp-Golomb-coded syntax element with the left bit first.

An Exp-Golomb bit string may be converted to a code number (codeNum) for example using the following table:

| Bit string | code Num |
| --- | --- |
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| ... | ... |

A code number corresponding to an Exp-Golomb bit string may be converted to se(v) for example using the following table:

| codeNum | syntax element value |
| --- | --- |
| 0 | 0 |
| 1 | 1 |
| 2 | −1 |
| 3 | 2 |

| codeNum | syntax element value |
|---------|---------------------|
| 4 | −2 |
| 5 | 3 |
| 6 | −3 |
| ... | ... |

In example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

An example embodiment for 3DV-ATM is provided next.

A 3DV NAL unit is defined for GOS parameter sets, coded slices of enhanced texture views, and coded depth slices. The NAL unit header length for the 3DV NAL unit (e.g. using NAL unit type 21) is 2 bytes. The second byte contains temporal_id, 3dv_nal_unit_type, and gos_param_id. 3dv_nal_unit_type specifies whether the NAL unit contains a GOS parameter set or a 3DV slice. If the NAL unit contains a GOS parameter set, gos_param_id provides the identifier value of the GOS parameter set specified in the NAL unit. If the NAL unit contains a slice, gos_param_id refers to the GOS parameter set containing the values of the slice header syntax elements for the slice. Syntax elements that were earlier included in the MVC NAL unit header extension are present in the GOS parameter set.

The nal_unit syntax is appended with the section in italics below, assuming that NAL unit type 21 is reserved for the 3DV NAL unit.

| nal_unit( NumBytesInNALunit ) { | | Descriptor |
|---|---|---|
|   forbidden_zero_bit | ll | f(1) |
|   nal_ref_idc | ll | u(2) |
|   nal_unit_type | ll | u(5) |
|   NumBytesInRBSP = 0 | | |
|   nalUnitHeaderBytes = 1 | | |
|   if( nal_unit_type = = 14 \|\| | | |
| nal_unit_type = = 20 ) { | | |
|     svc_extension_flag | ll | u(1) |
|     if( svc_extension_flag ) | | |
|       nal_unit_header_svc_extension( ) /* specified in Annex G */ | ll | |
|     else | | |
|       nal_unit_header_mvc_extension( ) /* specified in Annex H */ | ll | |
|     nalUnitHeaderBytes += 3 | | |
|   } | | |
|   else if( nal_unit_type = = 21 ) { | | |
|     nal_unit_header_3dv_extension( ) | ll | |
|     nalUnitHeaderBytes += 1 | | |
|   } | | |
|   for( i = nalUnitHeaderBytes; i < NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | ll | b(8) |
|       rbsp_byte[ NumBytesInRBSP++ ] | ll | b(8) |
|       i += 2 | | |
|       emulation_prevention_three_byte /* equal to 0x03 */ | ll | f(8) |
|     } else | | |
|       rbsp_byte[ NumBytesInRBSP++ ] | ll | b(8) |
|   } | | |
| } | | |

The syntax of nal_unit_header_3dv_extension( ) may be specified as follows.

| nal_unit_header_3dv_extension( ) { | | Descriptor |
|---|---|---|
|   3dv_nal_unit_type | ll | u(1) |
|   temporal_id | ll | u(3) |
|   gos_param_id | ll | u(4) |
| } | | |

The semantics of nal_unit_header_3dv_extension( ) may be specified as follows.

3dv_nal_unit_type equal to 0 specifies that the NAL unit contains a GOS parameter set. 3dv_nal_unit_type equal to 1 specifies that the NAL unit contains a coded slice 3DV extension.

temporal_id specifies a temporal identifier for the NAL unit. When nal_unit_type is equal to 1 or 5 and the NAL unit is not immediately preceded by a NAL unit with nal_unit_type equal to 14, temporal_id may be inferred to be equal to the value of temporal_id for the non-base views in the same access unit. The value of temporal_id may be the same for all prefix, coded slice MVC extension, and 3DV NAL units of an access unit. When an access unit contains any NAL unit with nal_unit_type equal to 5 or non_idr_flag equal to 0, temporal_id may be equal to 0. The assignment of values to temporal_id may further be constrained by a sub-bitstream extraction process.

gos_param_id specifies a GOS parameter set identifier. When 3dv_nal_unit_type is equal to 0, gos_param_id specifies the identifier of the GOS parameter set that is in use for the coded slice 3DV extension contained in the NAL unit. When 3dv_nal_unit_type is equal to 1, gos_param_id specifies the identifier of the GOS parameter set that is specified in the NAL unit. When 3dv_nal_unit_type is equal to 1, gos_param_id may be in the range of 0 to 15, inclusive. When 3dv_nal_unit_type is equal to 0, gos_param_id may be in the range of 1 to 15, inclusive.

The syntax of 3dv_nal_unit( ) e.g. NAL unit type 21, is specified as follows:

| 3dv_nal_unit( ) { | Descriptor |
|---|---|
|   if( 3dv_nal_unit_type = = 1 ) { | |
|     slice_header_in_3dv_extension( ) | |
|     slice_data( ) | |
|     rbsp_slice_trailing_bits( ) | |
|   } | |

-continued

| 3dv_nal_unit( ) { | Descriptor |
|---|---|
|     else if(3dv_nal_unit_type == 0 ) { | |
|         gos_param_set( ) | |
|         rbsp_trailing_bits( ) | |
|     } | |
| } | |

The syntax of gos_param_set( ) i.e. the GOS parameter set syntax structure, is specified as follows:

| gos_param_set( ) { | Descriptor |
|---|---|
|   slice_param_for_3dv_view_component( ) | |
|   slice_param_for_au_flag | u(1) |
|   if( slice_param_for_au_flag ) | |
|     slice_param_for_au( ) | |
|   i = 0 | |
|   numNotPredicted = 3 | |
|   RPLMFlag[ gos_param_id ] = 0 | |
|   PredWeightFlag[ gos_param_id ] = 0 | |
|   MMCOFlag[ gos_param_id ] = 0 | |
|   do { | |
|     gos_param_inheritance_flag | u(1) |
|     if( gos_param_inheritance_flag ) | |
|       ref_gos_param_id[ i ] | u(4) |
|     if( !RPLMFlag[ gos_param_id ] ) { | |
|       ref_pic_list_modification_flag[ i ] | u(1) |
|       numNotPredicted −= ref_pic_list_modification_flag[ i ] | |
|       RPLMFlag[ gos_param_id ] = RPLMFlag[ gos_param_id ] \| ref_pic_list_modification_flag[ i ] | |
|     } | |
|     if( !PredWeightFlag[ gos_param_id ] ) { | |
|       pred_weight_flag[ i ] | u(1) |
|       numNotPredicted −= pred_weight_flag[ i ] | |
|       PredWeightFlag[ gos_param_id ] = PredWeightFlag[ gos_param_id ] \| pred_weight_flag[ i ] | |
|     } | |
|     if( !MMCOFlag[ gos_param_id ] ) { | |
|       dec_ref_pic_marking_flag[ i ] | u(1) |
|       numNotPredicted −= dec_ref_pic_marking_flag[ i ] | |
|       MMCOFlag[ gos_param_id ] = MMCOFlag[ gos_param_id ] \| dec_ref_pic_marking_flag[ i ] | |
|     } | |
|     if( gos_param_inheritance_flag && numNotPredicted > 0 ) | |
|       i++ | |
|   } while( gos_param_inheritance_flag && numNotPredicted > 0 ) | |
|   if( !gos_param_inheritance_flag ) { | |
|     if( ref_pic_list_modification_flag[ i ] == 1 ) | |
|       ref_pic_list_3dv_modification( ) | |
|     if( pred_weight_flag[ i ] == 1 ) | |
|       pred_weight_table( ) | |
|     if( dec_ref_pic_marking_flag[ i ] == 1 ) | |
|       dec_ref_pic_marking( ) | |
|   } | |
| } | |

The semantics of gos_param_set( ) are specified as follows:

slice_param_for_au_flag equal to 0 specifies that the values of the syntax elements contained in the slice_param_for_au( ) syntax structure are the same as in any other GOS parameter set or slice header syntax structure of the same access unit. slice_param_for_au_flag equal to 1 specifies that the slice_param_for_au( ) syntax structure is present in this GOS parameter set.

When gos_parameter_inheritance_flag is equal to 0, ref_pic_list_modification_flag[i], pred_weight_flag[i], and dec_ref_pic_marking_flag[i] are specified as follows.

ref_pic_list_modification_flag[i] equal to 1 specifies that the ref_pic_list_3dv_modification( ) syntax structure in effect in the GOS parameter set identified by gos_param_id is present. The semantics of ref_pic_list_modification_flag[i] equal to 0 are unspecified.

pred_weight_flag[i] equal to 1 specifies that the pred_weight_table( ) syntax structure in effect in the GOS parameter set identified by go_sparam_id is present. The semantics of pred_weight_flag[i] equal to 0 are unspecified.

dec_ref_pic_marking_flag[i] equal to 1 specifies that the dec_ref_pic_marking( ) syntax structure of the GOS parameter set in effect in the GOS parameter set identified by gos_param_id is present. The semantics of dec_ref_pic_marking_flag[i] equal to 0 are unspecified.

When gos_parameter_inheritance_flag is equal to 1, ref_gos_param_id[i], ref_pic_list_modification_flag[i], pred_weight_flag[i], and dec_ref_pic_marking_flag[i] are specified as follows.

ref_gos_param_id[i] identifies the GOS parameter set used as the source for obtaining the syntax structures identified by ref_pic_list_modification_flag[i], pred_weight_flag[i], and dec_ref_pic_marking_flag[i] that are in effect for the GOS parameter set identified by gos_param_id. ref_gos_param_id[i] equal to 0 identifies that the slice header of the texture view component of the base view of the same access unit is used as the source for obtaining the syntax structures identified by ref_pic_list_modification_flag[i], pred_weight_flag[i], and dec_ref_pic_marking_flag[i] that are in effect for the GOS parameter set identified by gos_param_id.

ref_pic_list_modification_flag[i] equal to 1 specifies that the ref_pic_list_3dv_modification( ) syntax structure of the GOS parameter set identified by ref_gos_param_id[i] is in effect in the GOS parameter set identified by gos_param_id. The semantics of ref_pic_list_modification_flag[i] equal to 0 are unspecified.

pred_weight_flag[i] equal to 1 specifies that the pred_weight_table( ) syntax structure of the GOS parameter set identified by ref_gos_param_id[i] is in effect in the GOS parameter set identified by gos_param_id. The semantics of pred_weight_flag[i] equal to 0 are unspecified.

dec_ref_pic_marking_flag[i] equal to 1 specifies that the dec_ref_pic_marking( ) syntax structure of the GOS parameter set identified by ref_gos_param_id[i] is in effect in the GOS parameter set identified by gos_param_id. The semantics of dec_ref_pic_marking_flag[i] equal to 0 are unspecified.

The syntax of slice_param_for_3dv_view_component( ) is specified as follows. The syntax structure contains syntax elements the value of which may remain unchanged for all slices of a view component.

| | Descriptor |
|---|---|
| slice_param_for_3dv_view_component( ) { | |
|   non_idr_flag | u(1) |
|   IdrPicFlag = !non_idr_flag | |
|   priority_id | u(6) |
|   view_id | u(10) |
|   anchor_pic_flag | u(1) |
|   inter_view_flag | u(1) |
|   depth_flag | u(1) |

| | Descriptor |
|---|---|
| single_slice_flag | u(1) |
| pic_param_set_id | ue(v) |
| if( !single_slice_flag ) { | |
|     initialisation_param_equal_flag | u(1) |
|     if( initialisation_param_equal_flag ) { | |
|         slice_param for_3dv( ) | |
|     } | |
| } | |
| } | |

The semantics of slice_param_for_3dv_view_component( ) are specified as follows.

The semantics of non_idr_flag, priority_id, view_id, anchor_pic_flag and inter_view_flag are the same as in MVC when the associated NAL unit is a 3DV NAL unit referring the GOS parameter set identified by gos_param_id.

depth_flag equal to 0 specifies that the NAL unit referring to GOS parameter set identified by gos_param_id contains a slice for enhanced texture view component. depth_flag equal to 1 specifies that the NAL unit referring to GOS parameter set identified by gos_param_id contains a slice for a depth view component.

single_slice_flag equal to 0 specifies that a view component referring to GOS parameter set identified by gos_param_id may have multiple slices. single_slice_flag equal to 1 specifies that each view component referring to GOS parameter set identified by gos_param_id contains exactly one slice.

initialisation_param_equal_flag equal to 0 specifies that no slice_param_for_3dv syntax structure is present. initialisation_param_equal_flag equal to 1 specifies that the slice_param_for_3dv syntax structure is present.

The syntax of slice_param_for_3dv( ) is specified as follows. The syntax structure may be included in the slice_paramfor_3dv_view_component( ) syntax structure or in the slice_headerin_3dv_extension( ) syntax structure.

| | Descriptor |
|---|---|
| slice_param_for_3dv( ) { | |
|   slice_type | ue(v) |
|   if( !depth_flag && | |
| separate_colour_plane_flag = = 1 ) | |
|     colour_plane_id | u(2) |
|   if( slice_type = = B ) | |
|     direct_spatial_mv_pred_flag | u(1) |
|   if( slice_type = = P || slice_type = = B ) { | |
|     num_ref_idx_active_override_flag | u(1) |
|     if( num_ref_idx_active_override_flag ) { | |
|       num_ref_idx_l0_active_minus1 | ue(v) |
|       if( slice_type = = B ) | |
|         num_ref_idx_l1_active_minus1 | ue(v) |
|   } | |
|   if( entropy_coding_mode_flag && | |
| slice_type != 1 ) | |
|     cabac_init_idc | ue(v) |
|   slice_qp_delta | se(v) |
|   if( deblocking_filter_control_present_flag ) { | |
|     disable_deblocking_filter_idc | ue(v) |
|     if( disable deblocking_filter_idc != 1 ) { | |
|       slice_alpha_c0_offset_div2 | se(v) |
|       slice_beta_offset_div2 | se(v) |
|     } | |
|   } | |
|   if( num_slice_groups_minus1 > 0 && | |
| slice_group_map_type >= 3 && | |
| slice_group_map_type <= 5) | |
|     slice_group_change_cycle | u(v) |
|   if( slice_type != 1 ) | |
|     if( depth_flag = = 0 ) | |
|       dmvp_flag | u(1) |
|     else if( ( slice_type==P && | |
| weighted_pred_flag = = 0) || | |
|       ( slice_type = = B && | |
|         weighted_bipred_idc = = 0 ) ) | |
|       depth_weighted_pred_flag | u(1) |
|   } | |

The semantics of slice_param_for_3dv( ) are specified as follows.

When slice_param_for_3dv( ) is included in the slice_param_for_3dv_view_component( ) syntax structure, the values of the syntax elements apply to all slices of a view component. When slice_param_for_3dv( ) is included in the slice_header_in_3dv_extension( ) syntax structure, the values of the syntax elements apply to the slice contained in the same NAL unit.

The semantics specified in H.264/AVC apply for the syntax elements of slice_param_for_3dv( ) with the following modifications. slice_type has an additional constraint that slice_type is not be equal to 3, 4, 8 or 9. When colour_plane_id is present, the semantics specified in H.264/AVC apply. When depth_flag is equal to 0, separate_colour_plane_flag is inferred to be equal to 1 and colour_plane_id is inferred to be equal to 0. direct_spatial_mv_pred_flag has the same semantics as specified in H.264/AVC with the following modification. When RefPicList1[0] points to an inter-view reference component or an inter-view only reference component, which belongs to the same access unit as the current view component, direct_spatial_mv_pred_flag is equal to 1. num_ref_idx_l0_active_minus1 and num_ref_idx_l1_active_minus1 have the same semantics as specified in MVC. dmvp_flag equal to 0 specifies that the inter and inter-view prediction process specified in MVC is applied. dmvp_flag equal to 1 specifies that the depth-based inter and inter-view prediction process is applied. depth_weighted_pred_flag equal to 0 specifies that no depth-range-based weighted prediction is used for P or B slices of depth view components. depth_weighted_pred_flag equal to 1 specifies that depth-range-based weighted prediction is used for P and B slices of depth view components.

The syntax of slice_param_for_au( ) is specified as follows. The syntax structure contains syntax elements the value of which may remain unchanged for all slices of an access unit of containing 3DV NAL units.

| | Descriptor |
|---|---|
| slice_param_for_au( ) { | |
|     frame_num | u(v) |
|     if( !frame_mbs_only_flag ) { | |
|         field_pic_flag | u(1) |
|         if( field_pic_flag ) | |
|             bottom_field_flag | u(1) |
|     } | |
|     if( IdrPicFlag ) | |
|         idr_pic_id | ue(v) |
|     if( pic_order_cnt_type = = 0 ) { | |
|         pic_order_cnt_lsb | u(v) |
|         if( bottom_field_pic_order_in_frame_present_flag && !field_pic_flag ) | |
|             delta_pic_order_cnt_bottom | se(v) |
|     } | |
|     if( pic_order_cnt_type = = 1 && !delta_pic_order_always_zero_flag ) { | |
|         delta_pic_order_cnt[ 0 ] | se(v) |
|         if( bottom_field_pic_order_in_frame_present_flag && !field_pic_flag ) | |
|             delta_pic_order_cnt[ 1 ] | se(v) |
|     } | |
| } | |

The semantics of slice_param_for_au( ) are specified as follows. The semantics specified in H.264/AVC apply with the following additional constraints. The value of each syntax element in slice_param_for_au may remain unchanged in all slice headers and slice_header_for_au syntax structures included in the same access unit.

The syntax of slice_header_in_3dv_extension( ) is specified as follows. The values of single_slice_flag and initialisation_param_equal_flag are from the GOS parameter set identified by gos_param_id.

| | Descriptor |
|---|---|
| slice_header_in_3dv_extension( ) { | |
|     if( !single_slice_flag ) | |
|         first_mb_in_slice | ue(v) |
|     if( single_slice_flag \|\| !initialisation_param_equal_flag ) | |
|         slice_param_for_3dv( ) | |
|     if( !RPLMFlag[ gos_param_id ] ) { | |
|         ref_pic_list_3dv_modification( ) | |
|     if( !PredWeightFlag[ gos_param_id ] && ( ( slice_type==P && weighted_pred_flag = = 1 ) \|\| ( slice_type = = B && weighted_bipred_idc = = 1 ) ) ) { | |
|         pred_weight_table( ) | |
|     if( !MMCOFlag[ gos_param_id ] ) | |
|         dec_ref_pic_marking( ) | |
| } | |

The semantics of slice_header_in_3dv_extension( ) are specified as follows. The semantics specified in H.264/AVC apply. If a syntax element or structure is not present in slice_header_in_3dv_extension( ), its value is inherited from the GOS parameter set identified by gos_param_id.

An example embodiment for HEVC and its potential scalable extensions is provided next. Said scalable extensions may include for example medium grain and/coarse grain quality scalability, spatial scalability, extended spatial scalability, multiview coding, depth-enhanced coding, auxiliary picture coding, bit-depth scalable coding, or any combination thereof.

With scalable extensions enabled, an access unit can consist of a relatively large number of component pictures, such as coded texture and depth view components as well as dependency and layer representations. The coded size of some component pictures may be relatively small for example because they can be considered to represent deltas relative to base view or base layer and because depth component pictures may be relatively easy to compress. Consequently, the NAL unit header and slice header overhead may take a greater proportional share of the byte count used for such component pictures.

The HEVC codec may be vulnerable to transmission errors and any type of error concealment may result into an increase in both the magnitude and the spatial area of the error over time. Many of the transmission systems, such as MPEG-DASH, are error-free.

Some of the scalability properties of SVC and MVC are provided in the NAL unit header due to which the NAL unit header has relatively large size, i.e. 4 bytes, for coded slices of SVC and MVC. A smaller NAL unit header size could be achieved, if the NAL unit header or slice header gave a reference to a parameter set, where the scalability properties were provided. However, such a design would require that an entity performing sub-bitstream extraction or scalable adaptation of the bitstream, such as a multimedia gateway or a Multipoint Conference Control Unit (MCU), has to have access to the parameter sets and maintain the activation state of the parameter sets.

The example embodiment provided below may provide solutions to tackle the following technical areas jointly. First, the example embodiment may provide hooks for HEVC scalable extensions. Second, it may be possible to provide sub-bitstream extraction that does not require access to parameter sets, parsing of parameter sets, or keeping track of the activation of parameter sets. Third, the example embodiment may provide reduction of the NAL unit header size when compared to the 4-byte header of SVC and MVC. Fourth, it may also provide reduction of the slice header byte count overhead when a picture contains multiple slices. Fifth, a further provision of the example embodiment may include reduction of the slice header byte count overhead in scalable extensions.

A component picture may be defined as a component picture delimiter NAL unit and the subsequent coded slice NAL units until the end of the access unit or until the next component picture delimiter NAL unit, exclusive, whichever is earlier in decoding order. In practice, in HEVC without scalable extensions, the component picture may be considered to contain the coded picture of an access unit, and in the future scalable extensions a component picture would contain for example a view component, a depth map, a dependency representation, a layer representation.

Component pictures are separated from each other using a component picture delimiter NAL unit, which may also carry common syntax element values to be used for decoding of the coded slices of the component picture.

In this example embodiment each component picture is given a component picture dependency identifier (cpd_id), which is signalled both for the component picture delimiter NAL unit and for the coded slices, hence forming the association between them.

Figure 10:
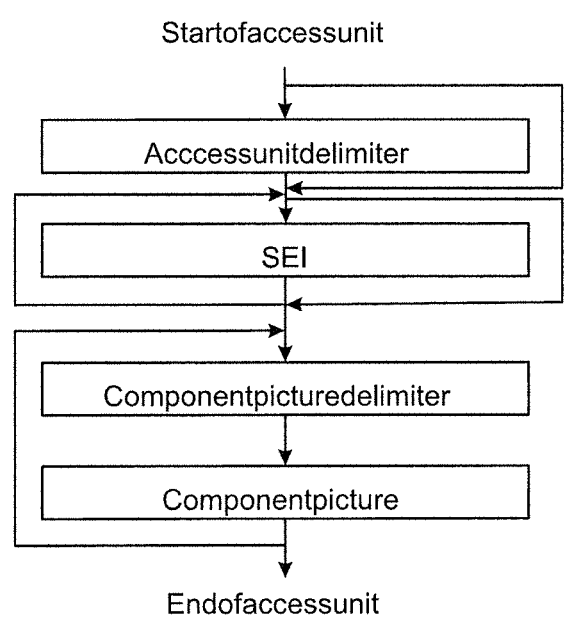
FIG. 10 illustrates in a simplified manner a structure of an access unit according to an example embodiment.

FIG. 10 provides a simplified illustration of the structure of an access unit according to an example embodiment.

An access unit may start with an access unit delimiter NAL unit, which may be optionally present. Zero or more SEI NAL units may follow the access unit delimiter NAL unit (if present). A component picture delimiter NAL unit precedes each component picture. A component picture comprises one or more coded slice NAL units. There may be one or more component pictures within an access unit.

The syntax elements of the slice header are categorized into a syntax element structures, where each structure may have similar characteristics within a component picture, i.e. either staying unchanged in all coded slices of a component picture or changing between the coded slices of a component picture. For example, the following syntax element structures or slice parameter structures may be specified:
1. Picture identification (idr_pic_id and POC related)
2. Reference picture set
3. Adaptation parameter set ID
4. Deblocking filter control
5. Adaptive loop filter control
6. Reference picture list construction
7. Prediction weight table for weighted prediction When coding a component picture delimiter NAL unit, it can be indicated whether which ones the above-mentioned are present in the component picture delimiter NAL unit and hence shared among all the coded slices of the component picture. The syntax element structures not present in the component picture delimiter NAL unit may be present in the slice header.

Figure 11:
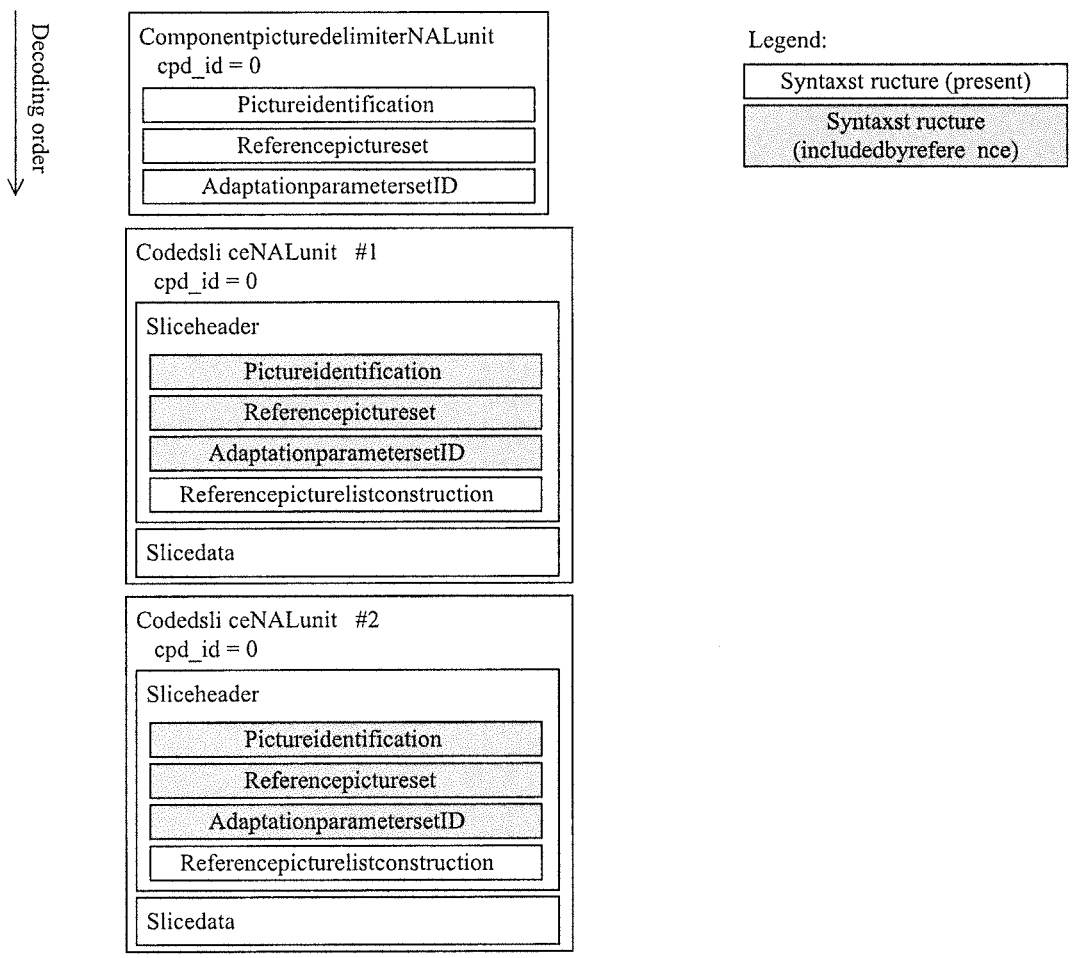
FIG. 11 illustrates an example of a component picture including a component picture delimiter NAL unit and two coded slice NAL units.

FIG. 11 provides an example of a component picture including a component picture delimiter NAL unit and two coded slice NAL units. The component picture NAL unit includes three out of the seven slice parameter syntax structures listed above: picture identification, reference picture set, and adaptation parameter set ID. The coded slices inherit these three slice parameter structures from the component picture delimiter NAL unit. In this example, the slice headers of the coded slices also contain reference picture list construction structures, which in this example is adapted differently for the coded slices and hence not included in the component picture delimiter NAL unit. The remaining three structures are not present in this example, but the operation of deblocking filter and adaptive loop filter is governed by the APS in effect and weighted prediction is not in use in this example and hence the prediction weight table is not present.

In environments where independent decoding of slices may be desirable even if one or more component picture delimiters were lost, any of the following strategies could be used:
The encoder may choose not to code slice header syntax elements in the component picture delimiter, but in the slice headers as done conventionally. Hence, the same error robustness as with the current HEVC WD can be reached.

A mechanism to repeat component picture delimiter NAL units could be introduced. The mechanism can be introduced in HEVC—for example, an SEI mechanism where SEI messages are allowed at any point in the bitstream can be introduced and component picture delimiter repetition can be carried with such SEI messages. Alternatively or in addition, a mechanism in the transport level can be used. For example, component picture delimiter NAL units could be repeated, when the transmitter sees it appropriate, within transport packets e.g. carried within a mechanism such as the PACSI NAL unit of the SVC RTP payload format.

In order to reduce the bit count to carry slice header parameters even further when multiple component pictures are present in an access unit, a prediction of selected parameters can take place across component picture delimiter NAL units. For example, in depth-enhanced multiview video coding it may be beneficial that some of the slice parameter structures are predicted between texture and depth view components of the same view_id, whereas for some other syntax elements, it is better to inherit syntax elements from a different view component of the same component type (texture or depth).

In practice, a component picture delimiter NAL unit for a non-base component picture can contain either by inclusion or by reference to another component picture delimiter NAL unit the indicated syntax element structures. The reference is given in terms of a cpd_id value. The syntax elements in a component picture delimiter NAL unit having cpd_id equal to CPDID1 are clustered into syntax element sets. Each syntax element set may be selectively copied from an earlier component picture delimiter NAL having cpd_id equal to CPDID2 unit in the same access unit. CPDID1 is greater than CPDID2. Hence, slice header parameters can be efficiently and flexibly shared among component pictures.

Figure 12:
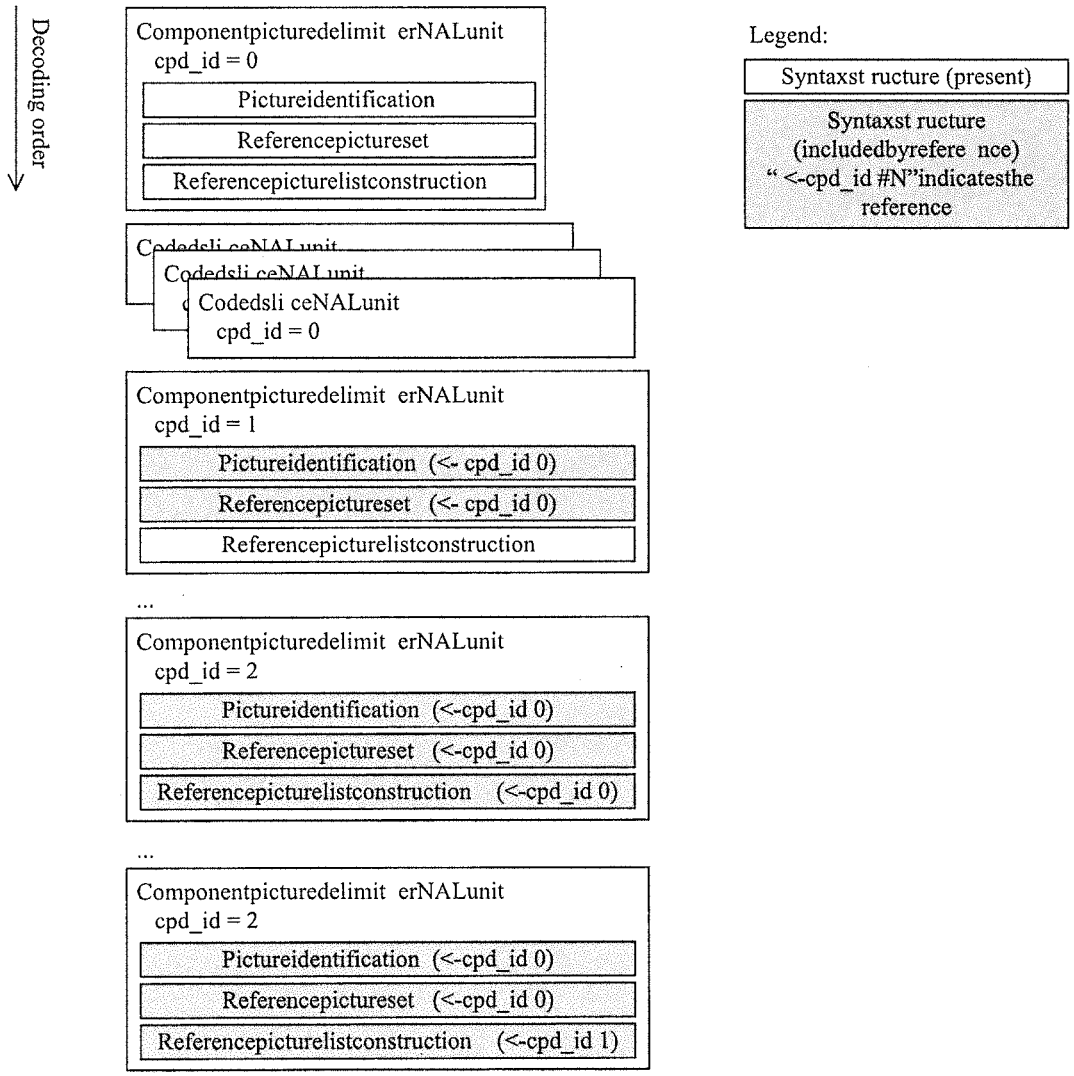
FIG. 12 illustrates an example of inter-CPD prediction of slice parameter structures.

FIG. 12 provides an example illustrating a multiview-plus-depth access unit with two texture and depth component pictures. The bitstream order of these component pictures is assumed to be the following: base view texture picture, base view depth picture, non-base view texture picture, and non-base view depth picture. In this example, picture identification and reference picture set structures are the same in all component pictures and hence included by reference in the component picture delimiter NAL units with cpd_id greater than 0. The reference picture lists of texture components pictures are the same, and the reference picture lists for depth component pictures are the same. However, the reference picture lists of texture component pictures differ from those of the depth component pictures. Hence, the prediction source changes for the reference picture list construction structure. In this example, it is assumed that the remaining four slice parameter structures are included in slice headers or are absent. Note that cpd_id of the last two picture delimiter NAL units may be the same value (2), as neither of them are used for prediction of any subsequent picture delimiter NAL unit.

Each component picture is given a component picture dependency identifier (cpd_id), which is also signalled in the NAL unit header. The values of cpd_id are constrained in such a manner that sub-bitstream extraction can be done on the basis of cpd_id. In other words, a bitstream formed by excluding component picture delimiter NAL units and coded slice NAL units having a certain cpd_id greater than 0 is a conforming bitstream.

In this example embodiment the cpd_id is included in the NAL unit header. Therefore, it has a limited value range (for example 5 bits). In a general case, there might be a greater number of component pictures within an access unit than the maximum value provided by the value range (for example 32). Consequently, cpd_id values may have to be re-used within an access unit. In some example embodiments component picture delimiter NAL units may have nested prediction structure, i.e. a component picture delimiter NAL unit having cpd_id equal to CPDID1 may be predicted from the component picture delimiter NAL units determined as follows and are not predicted from any other component picture delimiter NAL units. In the following, component picture delimiter NAL units within an access unit are indexed in decoding order (i.e. bitstream order) with 0, 1, 2, . . . and the index of the current component picture delimiter NAL unit having cpd_id equal to CPDID1 is equal to currIndex, where currIndex is greater than 0. This can be illustrated with the following pseudo code.

```
currSmallestCpdId = CPDID1
for( i = currIndex − 1, j = 0; i > 0; i . . . ) {
    if( cpdId[ i ] < currSmallestCpdId ) {
        refCpdIdx[ j ] = i
        j++
        currSmallestCpdId = cp_id[ i ]
    }
}
numRefCpdIdx = j
```

In the pseudo-code,
an input parameter cpdId[i] provides the cpd_id value of the component picture delimiter NAL unit with index i within the access unit;
an output parameter numRefCpdIdx provides the number of component picture delimiter NAL units that may be used to predict the current component picture delimiter NAL unit; and
if numRefCpdIdx is greater than 0, refCpdIdx[j] provides the indexes of the component picture delimiter NAL units which may be used for predicting the current component picture delimiter NAL unit, where j is in the range of 0 to numRefCpdIdx−1, inclusive.

Consequently, sub-bitstream extraction can also be done in a finer granularity within an access unit as follows. If the component picture consisting of a component picture delimiter NAL unit and the following coded slice NAL units, all having cpd_id equal to CPDID1, is removed from the bitstream, then the component pictures that should also be removed from the bitstream can be determined with the following algorithm. As above, the component pictures within an access unit are indexed in decoding order (i.e. bitstream order) with 0, 1, 2, . . . and the index of the current component picture (to be removed) is currIndex, and the total number of component pictures within the access unit is numIndex.

```
for( i = currIndex + 1, j = 0; i < numIndex; i++) {
    if( cpdId[ i ] > CPDID1 ) {
        toBeRemovedIdx[ j ] = i
        j++
    }
    else
        break
}
numToBeRemovedIdx = j
```

In the pseudo-code, "break" exits the loop (as in C programming language) and the inputs and outputs are as follows:
an input parameter cpdId[i] provides the cpd_id value of the component picture delimiter NAL unit with index i within the access unit;
an output parameter numToBeRemovedIdx provides the number of component pictures to be removed from the access unit in addition to the current component picture; and
if numToBeRemovedIdx is greater than 0, toBeRemovedIdx[j] provides the indexes of the component pictures to be removed from the access in addition to the current component picture, where j is in the range of 0 to numToBeRemoved−1, inclusive.

This kind of removal or sub-bitstream extraction process does not study which component picture delimiter NAL units are actually used for prediction, but only uses the information which component picture delimiter NAL units may be used for prediction as governed by the constraints of cpd_id semantics. However, this sub-bitstream extraction process may operate only with cpd_id values which are accessible in the NAL unit header and can be used in a straightforward manner e.g. in media gateways or MCUs.

In the following, an example embodiment of some syntax structures are described.

The NAL unit syntax may include the following:

|  | Descriptor |
|---|---|
| nal_unit( NumBytesInNALunit ) { |  |
|   forbidden_zero_bit | f(1) |
|   nal_ref_flag | u(1) |
|   nal_unit_type | u(6) |
|   NumBytesInRBSP = 0 |  |
|   nalUnitHeaderBytes = 1 |  |
|   if( nal_unit_type = = 1 \|\| nal_unit_type = = 4 \|\| nal_unit_type = = 5 |  |
|     \|\| nal_unit_type = = 10 ) { |  |
|     temporal_id | u(3) |
|     cpd_id | u(5) |
|     nalUnitHeaderBytes += 1 |  |
|   } |  |
|   for( i = nalUnitHeaderBytes; i < NumBytesInNALunit; i++ ) { |  |
|     if( i + 2 < NumBytesInNALunit && next_bits( 24 ) = = 0x000003 ) { |  |
|       rbsp_byte[ NumBytesInRBSP++ ] | b(8) |
|       rbsp_byte[ NumBytesInRBSP++ ] | b(8) |
|       i += 2 |  |
|       emulation_prevention_three_byte /* equal to 0x03 */ | f(8) |
|     } else |  |
|       rbsp_byte[ NumBytesInRBSP++ ] | b(8) |
|   } |  |
| } |  |

The semantics of cpd_id are added as follows. cpd_id is an identifier of a component picture. The values of cpd_id are constrained as described above.

The table of NAL unit types may include the following:

| nal_unit_type | Content of NAL unit and RBSP syntax structure | NAL unit type class |
|---|---|---|
| 0 | Unspecified | non-VCL |
| 1 | Coded slice of a non-IDR and non-CRA picture slice_layer_rbsp( ) | VCL |
| 2-3 | Reserved | n/a |
| 4 | Coded slice of a CRA picture | VCL |

-continued

| nal_unit_type | Content of NAL unit and RBSP syntax structure | NAL unit type class |
|---|---|---|
| | slice_layer_rbsp( ) | |
| 5 | Coded slice of an IDR picture slice_layer_rbsp( ) | VCL |
| 6 | Supplemental enhancement information (SEI) sei_rbsp( ) | non-VCL |
| 7 | Sequence parameter set seq_parameter_set_rbsp( ) | non-VCL |
| 8 | Picture parameter set pic_parameter_set_rbsp( ) | non-VCL |
| 9 | Access unit delimiter access_unit_delimiter_rbsp( ) | non-VCL |
| 10 | Component picture delimiter component_picture_delimiter_rbsp( ) | VCL |
| 11 | Reserved | n/a |
| 12 | Filler data filler_data_rbsp( ) | non-VCL |
| 13-23 | Reserved | n/a |
| 24 . . . 63 | Unspecified | non-VCL |

The syntax structure of component picture delimiter NAL unit according to an example embodiment is as follows.

| | Descriptor |
|---|---|
| component_picture_delimiter_rbsp( ) { | |
|   structure_idc | u(8) |
|   if( structure_idc == 0 ) { | |
|     output_flag | u(1) |
|     idr_pic_flag | u(1) |
|     IdrPicFlag = idr_pic_flag | |
|     single_slice_type_flag | u(1) |
|     if( single_slice_type_flag ) { | |
|       slice_type | ue(v) |
|       if( slice_type == P \|\| slice_type == B ) | |
|         numStructs = 7 | |
|       else | |
|         numStructs = 5 | |
|     } | |
|     else | |
|       numStructs = 5 | |
|     pic_parameter_set_id | ue(v) |
|     for( i = 0; i < numStructs; i++ ) | |
|       SliceParamFlag[ cpd_id ][ i ] = 0 | |
|     numNotCoded = numStructs | |
|     idx = −1 | |
|     do { | |
|       idx++ | |
|       if( cpd_id > 0 ) { /* Note: this branch is needed only in scalable extensions */ | |
|         pred_flag | u(1) |
|         predFlag = pred_flag | |
|         if( pred_flag && cpd_id > 1 ) | |
|           ref_cpd_id[ idx ] | u(v) |
|       } | |
|       else | |
|         predFlag = 0 | |
|       for( i = 0; i < numStructs; i++ ) { | |
|         slice_param_flag[ i ][ idx ] = 0 | |
|         if( !SliceParamFlag[ cpd_id ][ i ] ) { | |
|           slice_param_flag[ i ][ idx ] | u(1) |
|           numNotCoded −= | |
|           slice_param_flag[ i ][ idx ] | |
|           SliceParamFlag[ cpd_id ][ i ] = SliceParamFlag[ cpd_id ][ i ] \| slice_param_flag[ i ][ idx ] | |
|         } | |
|       } | |
|     } while( predFlag && numNotCoded > 0 ) | |
|     if( !predFlag ) | |
|       for( i = 0; i < numStructs; i++ ) | |
|         if( slice_param_flag[ i ][ idx ] ) | |
|           slice_param( i ) | |
|   } | |

| | Descriptor |
|---|---|
|   rbsp_trailing_bits( ) | |
| } | | structure_idc is an identifier of the structure used in this syntax structure. structure_idc can be used to indicate the presence and combination of different syntax elements being present in slice headers and component picture delimiter NAL units of component pictures specified HEVC scalable extensions. Component picture delimiter NAL units having structure_idc values that are not recognized may be ignored in the decoding process.

single_slice_type_flag equal to 0 specifies that the component picture may include slices of different slice types. single_slice_type_flag equal to 1 specifies that all the slices of the component picture have the same slice type.

pred_flag equal to 0 specifies that the following indicated slice parameter structures are included in this NAL unit. pred_flag equal to 1 specifies that the following indicated slice parameter structures are included by reference from a component picture delimiter NAL unit with cpd_id equal to ref_cpd_id[idx].

ref_cpd_id[idx] specifies the component picture delimiter NAL unit used as reference for indicated slice parameter structures.

slice_param_flag[i][idx] specifies that the i-th slice parameter structure is included in this component picture delimiter NAL unit. The inclusion may be done by reference to another component picture delimiter NAL unit.

According to an example embodiment the syntax of the slice header may include the following:

| | Descriptor |
|---|---|
| slice_header( ) { | |
|   entropy_slice_flag | u(1) |
|   if( !entropy_slice_flag ) { | |
|     if( !single_slice_type_flag ) | |
|       slice_type | ue(v) |
|     if( structure_idc == 0 ) { | |
|       if( slice_type == P \|\| slice_type == B ) | |
|         numStructs = 7 | |
|       else | |
|         numStructs = 5 | |
|       for( i = 0; i< numStructs; i++ ) | |
|         if( !SliceParamFlag[ cpd_id ][ i ] ) | |
|           slice_param( i ) | |
|     } | |
|   } | |
|   first_slice_in_pic_flag | u(1) |
|   if( first_slice_in_pic_flag = 0 ) | |
|     slice_address | u(v) |
|   if( !entropy_slice_flag ) { | |
|     slice_qp_delta | se(v) |
|     if( slice_type == B ) | |
|       collocated_from_l0_flag | u(1) |
|   } | |
|   if( slice_type == P \|\| slice_type == B ) | |
|     5_minus_max_num_merge_cand | ue(v) |
|   for( i = 0; i < num_substreams_minus1 + 1; i++ ){ | |
|     substream_length_mode | u(2) |
|     substream_length[i] | u(v) |
|   } | |
| } | |

While decoding or parsing the slice header, the syntax elements included in the preceding component picture delimiter NAL unit having the same cpd_id are in effect.

The following slice parameter syntax structures may be specified. These syntax structures comprise parameters residing in the slice header of a draft HEVC specification.

| | Descriptor |
|---|---|
| slice_param( 0 ) { | |
|   if( IdrPicFlag ) { | |
|     idr_pic_id | ue(v) |
|     no_output_of_prior_pics_flag | u(1) |
|   } | |
|   else { | |
|     pic_order_cnt_lsb | u(v) |
|   } | |
| } | |
| slice_param( 1 ) { | |
|   if( !IdrPicFlag ) { | |
|     short_term_ref_pic_set_pps_flag | u(1) |
|     if( !short_term_ref_pic_set_pps_flag ) | |
|       short_term_ref_pic_set( | |
|       num_short_term_ref_pic_sets ) | |
|     else | |
|       short_term_ref_pic_set_idx | u(v) |
|     if( long_term_ref_pics_present_flag ) { | |
|       num_long_term_pics | ue(v) |
|       for( i = 0; i < num_long_term_pics; i++ ) { | |
|         delta_poc_lsb_lt_minus1[ i ] | ue(v) |
|         used_by_curr_pic_lt_flag[ i ] | u(1) |
|       } | |
|     } | |
|   } | |
| } | |
|   slice_param( 2 ) { | |
|     if( sample_adaptive_offset_enabled_flag \|\| adaptive_loop_filter_enabled_flag ) | |
|       aps_id | ue(v) |
|   } | |
| slice_param( 3 ) { | |
|   inherit_dbl_params_from_APS_flag | u(1) |
|   if( !inherit_dbl_params_from_APS_flag ) { | |
|     disable_deblocking_filter_flag | u(1) |
|     if( !disable_deblocking_filter_flag ) { | |
|       beta_offset_div2 | se(v) |
|       tc_offset_div2 | se(v) |
|     } | |
|   } | |
| } | |
|   slice_param( 4 ) { | |
|     if( adaptive_loop_filter_enabled_flag && aps_adaptive_loop_filter_flag ) { | |
|       byte_align( ) | |
|       alf_cu_control_param( ) | |
|       byte_align( ) | |
|     } | |
|   } | |
| slice_param( 5 ) { | |
|   if( slice_type == P \|\| slice_type == B ) { | |
|     num_ref_idx_active_override_flag | u(1) |
|     if( num_ref_idx_active_override_flag ) { | |
|       num_ref_idx_l0_active_minus1 | ue(v) |
|       if( slice type == B ) | |
|         num_ref_idx_l1_active_minus1 | ue(v) |
|     } | |
|     ref_pic_list_modification( ) | |
|     ref_pic_list_combination( ) | |
|   } | |
| } | |
|   sliceparam( 6 ) { | |
|     if( ( weighted_pred_flag && slice_type == P) \|\| ( weighted_bipred_idc == 1 && slice_type == B ) ) | |
|       pred_weight_table( ) | |
|   } | |

The semantics of the syntax elements in these structures is unchanged compared to the semantics given in a draft HEVC specification.

For a scalable extension of HEVC, one or more new structure_idc values may be taken into use. Furthermore, a scalable extension may also take one or more new slice parameter structures into use. An example of a scalable extension for the component picture delimiter NAL unit with dependency_id and quality_id similar to those of SVC is provided below.

| | Descriptor |
|---|---|
| component_picture_delimiter_rbsp( ) { | |
|   structure_idc | u(8) |
|   if( structure_idc == 0 \|\| structure idc == 1 ) { | |
|     output_flag | u(1) |
|     idr_pic_flag | u(1) |
|     IdrPicFlag = idr_pic_flag | |
|     if( structure_idc == 1 ) { | |
|       dependency_id | u(3) |
|       quality_id | u(4) |
|     } | |
|   ... | |
| } | |

Prediction or inclusion by reference from one component picture delimiter NAL unit to another may be made conditional on the structure_idc value of the reference component picture delimiter NAL unit for prediction and/or the component picture delimiter NAL unit being predicted. For example, certain slice parameter structures may be valid for depth component pictures, while they may be absent for texture component pictures, and hence no prediction of such slice parameter structure takes place.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example there is provided a method of encoding an uncompressed picture into a coded picture comprising a slice, comprising:

encoding an uncompressed picture into a coded picture comprising a slice, the encoding comprising:

classifying syntax elements for the slice into a first set and a second set;

determining syntax element values for the first set and the second set;

encoding the first set selectively in a first group of slices parameter set or a slice header, wherein said encoding comprising one of the following:

providing an indication of an inclusion of the respective first set from another group of slices parameter set; or encoding the syntax element values of the first set; or omitting both of the above; and encoding the second set selectively in a second group of slices parameter set or the slice header, wherein said encoding comprising one of the following:

providing an indication of an inclusion of the respective second set from another group of slices parameter set; or encoding the syntax element values of the second set; or omitting both of the above.

In some embodiments the method comprises including at least a subset of syntax elements in the group of slices parameter set.

In some embodiments the method comprises inferring the contents or the instance of group of slices parameter set from other syntax structures already encoded or decoded or present in a bitstream.

In some embodiments the method comprises forming the group of slices parameter set from a slice header of a texture view component of a base view.

In some embodiments the method comprises forming an identifier value for the inferred group of slices parameter sets.

In some embodiments of the method a group of slices parameter set is valid within a particular access unit associated with it.

In some embodiments of the method the group of slices parameter set syntax structure is included in a network abstraction layer unit sequence for a particular access unit, where the sequence is in decoding or bitstream order, and the group of slices parameter set is valid from its appearance location until the end of the access unit.

In some embodiments of the method the group of slices parameter set is valid for more than one access unit.

In some embodiments the method comprises encoding many group of slices parameter sets for an access unit.

In some embodiments the method comprises determining whether at least a subset of syntax element values in a slice header to be coded would be the same in a subsequent slice header, and if so encoding the group of slices parameter set in a bitstream.

In some embodiments of the method the group of slices parameter set syntax structure includes an identifier.

In some embodiments the method comprises using the identifier to refer to a particular group of slices parameter set instance.

In some embodiments the method comprises using the identifier to refer to the group of slices from a slice header or another group of slices parameter set.

In some embodiments of the method a predetermined numbering space is used for the identifier.

In some embodiments the method comprises using a group of slices parameter set identifier value for a first group of slices parameter set and subsequently for a second group of slices parameter set, if the first group of slices parameter set is subsequently not referred to by any slice header or group of slices parameter set.

In some embodiments the method comprises repeating the group of slices parameter set syntax structure within a bitstream.

In some embodiments the method comprises identifying the group of slices parameter set syntax structure using a bitstream order of group of slices parameter set syntax structures and a pre-defined numbering scheme.

In some embodiments the method comprises forming the set of syntax elements for the group of slices parameter set from at least one of the following:

Syntax elements indicating a scalable layer and/or other scalability features;

Syntax elements indicating a view and/or other multiview features;

Syntax elements related to a particular component type of a multiview video;

Syntax elements related to access unit identification;

Syntax elements related to decoding order;

Syntax elements related to output order;

Syntax elements related to other syntax elements which may stay unchanged for all slices of an access unit;

Syntax elements which may stay unchanged in all slices of a view component;

Syntax elements related to reference picture list modification;

Syntax elements related to a reference picture set used;

Syntax elements related to decoding reference picture marking;

Syntax elements related to prediction weight tables for weighted prediction;

Syntax elements for controlling deblocking filtering;

Syntax elements for controlling adaptive loop filtering;

Syntax elements for controlling sample adaptive offset.

In some embodiments the method comprises one or more of the following when coding the group of slices parameter set:

coding the syntax element set into a group of slices parameter set syntax structure;

including the syntax element set by reference into a group of slices parameter set;

indicating the syntax element set to be absent from the group of slices parameter set.

In some embodiments the method comprises including a syntax element set related to scalable layers in the group of slices parameter set, and including a syntax elements which stays unchanged in all slices of a view component in the group of slices parameter set.

In some embodiments the method comprises including a syntax element related to reference picture list modification by reference in, included as such in, or be absent from the group of slices parameter set syntax structure.

In some embodiments the method comprises encoding a group of slices parameter set as a network abstraction layer unit.

In some embodiments the method comprises encoding group of slices parameter set NAL units in the bitstream together with coded slice network abstraction layer units.

According to a second example there is provided an apparatus comprising at least one processor and at least one memory including computer program code, the at least one memory and the computer program code configured to, with the at least one processor, cause the apparatus to:

classify syntax elements for a slice of a coded picture comprising into a first set and a second set;

determine syntax element values for the first set and the second set;

encode the first set selectively in a first group of slices parameter set or a slice header comprising one of the following:

providing an indication of an inclusion of the respective first set from another group of slices parameter set; or encoding the syntax element values of the first set; or omitting both of the above; and encode the second set selectively in a second group of slices parameter set or the slice header comprising one of the following:

providing an indication of an inclusion of the respective second set from another group of slices parameter set; or encoding the syntax element values of the second set; or omitting both of the above.

In some embodiments of the apparatus said at least one memory stored with code thereon, which when executed by said at least one processor, further causes the apparatus to include at least a subset of syntax elements in the group of slices parameter set.

In some embodiments of the apparatus said at least one memory stored with code thereon, which when executed by said at least one processor, further causes the apparatus to infer the contents or the instance of group of slices parameter set from other syntax structures already encoded or decoded or present in a bitstream.

In some embodiments of the apparatus said at least one memory stored with code thereon, which when executed by said at least one processor, further causes the apparatus to form the group of slices parameter set from a slice header of a texture view component of a base view.

In some embodiments of the apparatus said at least one memory stored with code thereon, which when executed by said at least one processor, further causes the apparatus to form an identifier value for the inferred group of slices parameter sets.

In some embodiments of the apparatus a group of slices parameter set is valid within a particular access unit associated with it.

In some embodiments of the apparatus said at least one memory stored with code thereon, which when executed by said at least one processor, further causes the apparatus to include the group of slices parameter set syntax structure in a network abstraction layer unit sequence for a particular access unit, where the sequence is in decoding or bitstream order, and the group of slices parameter set is valid from its appearance location until the end of the access unit.

In some embodiments of the apparatus the group of slices parameter set is valid for more than one access unit.

In some embodiments of the apparatus said at least one memory stored with code thereon, which when executed by said at least one processor, further causes the apparatus to encode many group of slices parameter sets for an access unit.

In some embodiments of the apparatus said at least one memory stored with code thereon, which when executed by said at least one processor, further causes the apparatus to determine whether at least a subset of syntax element values in a slice header to be coded would be the same in a subsequent slice header, and if so, to encode the group of slices parameter set in a bitstream.

In some embodiments of the apparatus said at least one memory stored with code thereon, which when executed by said at least one processor, further causes the apparatus to include an identifier in the group of slices parameter set syntax structure.

In some embodiments of the apparatus said at least one memory stored with code thereon, which when executed by said at least one processor, further causes the apparatus to use the identifier to refer to a particular group of slices parameter set instance.

In some embodiments of the apparatus said at least one memory stored with code thereon, which when executed by said at least one processor, further causes the apparatus to use the identifier to refer to the group of slices from a slice header or another group of slices parameter set.

In some embodiments of the apparatus said at least one memory stored with code thereon, which when executed by said at least one processor, further causes the apparatus to use a predetermined numbering space for the identifier.

In some embodiments of the apparatus said at least one memory stored with code thereon, which when executed by said at least one processor, further causes the apparatus to use a group of slices parameter set identifier value for a first group of slices parameter set and subsequently for a second group of slices parameter set, if the first group of slices parameter set is subsequently not referred to by any slice header or group of slices parameter set.

In some embodiments of the apparatus said at least one memory stored with code thereon, which when executed by said at least one processor, further causes the apparatus to repeat the group of slices parameter set syntax structure within a bitstream.

In some embodiments of the apparatus said at least one memory stored with code thereon, which when executed by said at least one processor, further causes the apparatus to identify the group of slices parameter set syntax structure using a bitstream order of group of slices parameter set syntax structures and a pre-defined numbering scheme.

In some embodiments of the apparatus said at least one memory stored with code thereon, which when executed by said at least one processor, further causes the apparatus to form the set of syntax elements for the group of slices parameter set from at least one of the following:

Syntax elements indicating a scalable layer and/or other scalability features;

Syntax elements indicating a view and/or other multiview features;

Syntax elements related to a particular component type of a multiview video;

Syntax elements related to access unit identification;

Syntax elements related to decoding order;

Syntax elements related to output order;

Syntax elements related to other syntax elements which may stay unchanged for all slices of an access unit;

Syntax elements which may stay unchanged in all slices of a view component;

Syntax elements related to reference picture list modification;

Syntax elements related to a reference picture set used;

Syntax elements related to decoding reference picture marking;

Syntax elements related to prediction weight tables for weighted prediction;

Syntax elements for controlling deblocking filtering;

Syntax elements for controlling adaptive loop filtering;

Syntax elements for controlling sample adaptive offset.

In some embodiments of the apparatus said at least one memory stored with code thereon, which when executed by said at least one processor, further causes the apparatus to perform one or more of the following when coding the group of slices parameter set:

coding the syntax element set into a group of slices parameter set syntax structure;

including the syntax element set by reference into a group of slices parameter set;

indicating the syntax element set to be absent from the group of slices parameter set.

In some embodiments of the apparatus said at least one memory stored with code thereon, which when executed by said at least one processor, further causes the apparatus to include a syntax element set related to scalable layers in the group of slices parameter set, and to include a syntax elements which stays unchanged in all slices of a view component in the group of slices parameter set.

In some embodiments of the apparatus said at least one memory stored with code thereon, which when executed by said at least one processor, further causes the apparatus to include a syntax element related to reference picture list modification by reference in, included as such in, or be absent from the group of slices parameter set syntax structure.

In some embodiments of the apparatus said at least one memory stored with code thereon, which when executed by said at least one processor, further causes the apparatus to encode a group of slices parameter set as a network abstraction layer unit.

In some embodiments of the apparatus said at least one memory stored with code thereon, which when executed by said at least one processor, further causes the apparatus to encode group of slices parameter set NAL units in the bitstream together with coded slice network abstraction layer units.

According to a third example there is provided a computer program product including one or more sequences of one or more instructions which, when executed by one or more processors, cause an apparatus to at least perform the following:

classify syntax elements for a slice of a coded picture comprising into a first set and a second set;

determine syntax element values for the first set and the second set;

encode the first set selectively in a first group of slices parameter set or a slice header comprising one of the following:

providing an indication of an inclusion of the respective first set from another group of slices parameter set; or encoding the syntax element values of the first set; or omitting both of the above; and encode the second set selectively in a second group of slices parameter set or the slice header comprising one of the following:

providing an indication of an inclusion of the respective second set from another group of slices parameter set; or encoding the syntax element values of the second set; or omitting both of the above.

In some embodiments the computer program product includes one or more sequences of one or more instructions which, when executed by one or more processors, further cause the apparatus to include at least a subset of syntax elements in the group of slices parameter set.

In some embodiments the computer program product includes one or more sequences of one or more instructions which, when executed by one or more processors, further cause the apparatus to infer the contents or the instance of group of slices parameter set from other syntax structures already encoded or decoded or present in a bitstream.

In some embodiments the computer program product includes one or more sequences of one or more instructions which, when executed by one or more processors, further cause the apparatus to form the group of slices parameter set from a slice header of a texture view component of a base view.

In some embodiments the computer program product includes one or more sequences of one or more instructions which, when executed by one or more processors, further cause the apparatus to form an identifier value for the inferred group of slices parameter sets.

In some embodiments of the computer program product a group of slices parameter set is valid within a particular access unit associated with it.

In some embodiments the computer program product includes one or more sequences of one or more instructions which, when executed by one or more processors, further cause the apparatus to include the group of slices parameter set syntax structure in a network abstraction layer unit sequence for a particular access unit, where the sequence is in decoding or bitstream order, and the group of slices parameter set is valid from its appearance location until the end of the access unit.

In some embodiments of the computer program product the group of slices parameter set is valid for more than one access unit.

In some embodiments the computer program product includes one or more sequences of one or more instructions which, when executed by one or more processors, further cause the apparatus to encode many group of slices parameter sets for an access unit.

In some embodiments the computer program product includes d by one or more processors, further cause the apparatus to determine whether at least a subset of syntax element values in a slice header to be coded would be the same in a subsequent slice header, and if so, to encode the group of slices parameter set in a bitstream.

In some embodiments the computer program product includes one or more sequences of one or more instructions which, when executed by one or more processors, further cause the apparatus to include an identifier in the group of slices parameter set syntax structure.

In some embodiments the computer program product includes one or more sequences of one or more instructions which, when executed by one or more processors, further cause the apparatus to use the identifier to refer to a particular group of slices parameter set instance.

In some embodiments the computer program product includes one or more sequences of one or more instructions which, when executed by one or more processors, further cause the apparatus to use the identifier to refer to the group of slices from a slice header or another group of slices parameter set.

In some embodiments the computer program product includes one or more sequences of one or more instructions which, when executed by one or more processors, further cause the apparatus to use a predetermined numbering space for the identifier.

In some embodiments the computer program product includes one or more sequences of one or more instructions which, when executed by one or more processors, further cause the apparatus to use a group of slices parameter set identifier value for a first group of slices parameter set and subsequently for a second group of slices parameter set, if the first group of slices parameter set is subsequently not referred to by any slice header or group of slices parameter set.

In some embodiments the computer program product includes one or more sequences of one or more instructions which, when executed by one or more processors, further cause the apparatus to repeat the group of slices parameter set syntax structure within a bitstream.

In some embodiments the computer program product includes one or more sequences of one or more instructions which, when executed by one or more processors, further cause the apparatus to identify the group of slices parameter set syntax structure using a bitstream order of group of slices parameter set syntax structures and a pre-defined numbering scheme.

In some embodiments the computer program product includes one or more sequences of one or more instructions which, when executed by one or more processors, further cause the apparatus to form the set of syntax elements for the group of slices parameter set from at least one of the following:

Syntax elements indicating a scalable layer and/or other scalability features;

Syntax elements indicating a view and/or other multiview features;

Syntax elements related to a particular component type of a multiview video;

Syntax elements related to access unit identification;

Syntax elements related to decoding order;

Syntax elements related to output order;

Syntax elements related to other syntax elements which may stay unchanged for all slices of an access unit;

Syntax elements which may stay unchanged in all slices of a view component;

Syntax elements related to reference picture list modification;

Syntax elements related to a reference picture set used;

Syntax elements related to decoding reference picture marking;

Syntax elements related to prediction weight tables for weighted prediction;

Syntax elements for controlling deblocking filtering;

Syntax elements for controlling adaptive loop filtering;

Syntax elements for controlling sample adaptive offset.

In some embodiments the computer program product includes one or more sequences of one or more instructions which, when executed by one or more processors, further cause the apparatus to perform one or more of the following when coding the group of slices parameter set:

coding the syntax element set into a group of slices parameter set syntax structure;

including the syntax element set by reference into a group of slices parameter set;

indicating the syntax element set to be absent from the group of slices parameter set.

In some embodiments the computer program product includes one or more sequences of one or more instructions which, when executed by one or more processors, further cause the apparatus to include a syntax element set related to scalable layers in the group of slices parameter set, and to include a syntax elements which stays unchanged in all slices of a view component in the group of slices parameter set.

In some embodiments the computer program product includes one or more sequences of one or more instructions which, when executed by one or more processors, further cause the apparatus to include a syntax element related to reference picture list modification by reference in, included as such in, or be absent from the group of slices parameter set syntax structure.

In some embodiments the computer program product includes one or more sequences of one or more instructions which, when executed by one or more processors, further cause the apparatus to encode a group of slices parameter set as a network abstraction layer unit.

In some embodiments the computer program product includes one or more sequences of one or more instructions which, when executed by one or more processors, further cause the apparatus to encode group of slices parameter set NAL units in the bitstream together with coded slice network abstraction layer units.

According to a fourth example there is provided an apparatus comprising:

means for classifying syntax elements for a slice of a coded picture comprising into a first set and a second set;

means for determining syntax element values for the first set and the second set;

means for encoding the first set selectively in a first group of slices parameter set or a slice header comprising one of the following:
providing an indication of an inclusion of the respective first set from another group of slices parameter set; or
encoding the syntax element values of the first set; or
omitting both of the above; and means for encoding the second set selectively in a second group of slices parameter set or the slice header comprising one of the following:
providing an indication of an inclusion of the respective second set from another group of slices parameter set; or
encoding the syntax element values of the second set; or
omitting both of the above.

According to a fifth example there is provided a method comprising:

decoding a coded slice of a coded picture, the decoding comprising:
identifying a first location of a first set of syntax elements and a second location of a second set of syntax elements to be used for decoding the coded slice to be one of a slice header or a group of slices parameter set,
decoding the first set of syntax elements and the second set of syntax elements to be used for decoding the coded slice, comprising:
decoding a first indication of an inclusion of the respective first set from a third group of slices parameter set, and as a response to the first indication being indicative of the third group of slices parameter set, decoding a respective first set of syntax elements from the third group of slices parameter set; and
decoding a second indication of an inclusion of the respective second set from a fourth group of slices parameter set, and as response to the first indication being indicative of the fourth group of slices parameter set, decoding a respective first set of syntax elements from the fourth group of slices parameter set; and
decoding the coded slice using the decoded first set and the second set of syntax elements.

In some embodiments the method comprises decoding syntax elements of the first set, if the first indication is not indicative of the third group of slices parameter set.

In some embodiments the method comprises decoding syntax elements of the second set, if the second indication is not indicative of the fourth group of slices parameter set.

According to a sixth example there is provided an apparatus comprising at least one processor and at least one memory including computer program code, the at least one memory and the computer program code configured to, with the at least one processor, cause the apparatus to:

decode a coded slice of a coded picture by:
identifying a first location of a first set of syntax elements and a second location of a second set of syntax elements to be used for decoding the coded slice to be one of a slice header or a group of slices parameter set,
decoding the first set of syntax elements and the second set of syntax elements to be used for decoding the coded slice, comprising:
decoding a first indication of an inclusion of the respective first set from a third group of slices parameter set, and as a response to the first indication being indicative of the third group of slices parameter set, decoding a respective first set of syntax elements from the third group of slices parameter set; and
decoding a second indication of an inclusion of the respective second set from a fourth group of slices parameter set, and as response to the first indication being indicative of the fourth group of slices parameter set, decoding a respective first set of syntax elements from the fourth group of slices parameter set; and
decoding the coded slice using the decoded first set and the second set of syntax elements.

In some embodiments of the apparatus said at least one memory stored with code thereon, which when executed by said at least one processor, further causes the apparatus to decode syntax elements of the first set, if the first indication is not indicative of the third group of slices parameter set.

In some embodiments of the apparatus said at least one memory stored with code thereon, which when executed by said at least one processor, further causes the apparatus to decode syntax elements of the second set, if the second indication is not indicative of the fourth group of slices parameter set.

According to a seventh example there is provided a computer program product including one or more sequences of one or more instructions which, when executed by one or more processors, cause an apparatus to at least perform the following:

decode a coded slice of a coded picture by:
identifying a first location of a first set of syntax elements and a second location of a second set of syntax elements to be used for decoding the coded slice to be one of a slice header or a group of slices parameter set,
decoding the first set of syntax elements and the second set of syntax elements to be used for decoding the coded slice, comprising:
decoding a first indication of an inclusion of the respective first set from a third group of slices parameter set, and as a response to the first indication being indicative of the third group of slices parameter set, decoding a respective first set of syntax elements from the third group of slices parameter set; and
decoding a second indication of an inclusion of the respective second set from a fourth group of slices parameter set, and as response to the first indication being indicative of the fourth group of slices parameter set, decoding a respective first set of syntax elements from the fourth group of slices parameter set; and
decoding the coded slice using the decoded first set and the second set of syntax elements.

In some embodiments the computer program product includes one or more sequences of one or more instructions which, when executed by one or more processors, cause the apparatus to decode syntax elements of the first set, if the first indication is not indicative of the third group of slices parameter set.

In some embodiments the computer program product includes one or more sequences of one or more instructions which, when executed by one or more processors, cause the apparatus to decode syntax elements of the second set, if the second indication is not indicative of the fourth group of slices parameter set.

According to an eighth example there is provided a method comprising:

decoding a coded slice of a coded picture, the decoding comprising:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decoding syntax elements of the first set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decoding syntax elements of the second set; and decoding the coded slice using the decoded first set of syntax elements and the second set of syntax elements.

In some embodiments the method comprises decoding at least a subset of syntax elements from the group of slices parameter set.

In some embodiments the method comprises inferring the contents or the instance of group of slices parameter set from other syntax structures already encoded or decoded or present in a bitstream.

In some embodiments the method comprises decoding an identifier value indicative of the inferred group of slices parameter sets.

In some embodiments of the method a group of slices parameter set is valid within a particular access unit associated with it.

In some embodiments of the method the group of slices parameter set syntax structure is included in a network abstraction layer unit sequence for a particular access unit, where the sequence is in decoding or bitstream order, and the group of slices parameter set is valid from its appearance location until the end of the access unit.

In some embodiments of the method the group of slices parameter set is valid for more than one access unit.

In some embodiments the method comprises decoding many group of slices parameter sets for an access unit.

In some embodiments of the method the group of slices parameter set syntax structure includes an identifier.

In some embodiments the method comprises using the identifier to refer to a particular group of slices parameter set instance.

In some embodiments the method comprises using the identifier to refer to the group of slices from a slice header or another group of slices parameter set.

In some embodiments of the method a predetermined numbering space is used for the identifier.

In some embodiments the method comprises using a group of slices parameter set identifier value for a first group of slices parameter set and subsequently for a second group of slices parameter set, if the first group of slices parameter set is subsequently not referred to by any slice header or group of slices parameter set.

In some embodiments the method comprises decoding a repetitive group of slices parameter set syntax structure from a bitstream.

In some embodiments the method comprises identifying the group of slices parameter set syntax structure using a bitstream order of group of slices parameter set syntax structures and a pre-defined numbering scheme.

In some embodiments the method comprises decoding the set of syntax elements for the group of slices parameter set to obtain at least one of the following:

Syntax elements indicating a scalable layer and/or other scalability features;

Syntax elements indicating a view and/or other multiview features;

Syntax elements related to a particular component type of a multiview video;

Syntax elements related to access unit identification;

Syntax elements related to decoding order;

Syntax elements related to output order;

Syntax elements related to other syntax elements which may stay unchanged for all slices of an access unit;

Syntax elements which may stay unchanged in all slices of a view component;

Syntax elements related to reference picture list modification;

Syntax elements related to a reference picture set used;

Syntax elements related to decoding reference picture marking;

Syntax elements related to prediction weight tables for weighted prediction;

Syntax elements for controlling deblocking filtering;

Syntax elements for controlling adaptive loop filtering;

Syntax elements for controlling sample adaptive offset.

In some embodiments the method comprises one or more of the following when decoding the group of slices parameter set:

decoding the syntax element set from a group of slices parameter set syntax structure;

determining whether the syntax element set has been included by reference into the group of slices parameter set;

determining whether the syntax element set is indicated to be absent from the group of slices parameter set.

In some embodiments the method comprises decoding a syntax element set related to scalable layers from the group of slices parameter set, and decoding a syntax element which stays unchanged in all slices of a view component from the group of slices parameter set.

In some embodiments the method comprises determining whether a syntax element related to reference picture list modification is included by reference in, included as such in, or be absent from the group of slices parameter set syntax structure.

In some embodiments the method comprises decoding a group of slices parameter set from a network abstraction layer unit.

In some embodiments the method comprises decoding group of slices parameter set NAL units from the bitstream together with coded slice network abstraction layer units.

According to a ninth example there is provided an apparatus comprising at least one processor and at least one memory including computer program code, the at least one memory and the computer program code configured to, with the at least one processor, cause the apparatus to:

decode a coded slice of a coded picture by:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decode syntax elements of the first set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decode syntax elements of the second set; and decoding the coded slice using the decoded first set of syntax elements and the second set of syntax elements.

In some embodiments of the apparatus said at least one memory stored with code thereon, which when executed by said at least one processor, further causes the apparatus to decode at least a subset of syntax elements from the group of slices parameter set.

In some embodiments of the apparatus said at least one memory stored with code thereon, which when executed by said at least one processor, further causes the apparatus to infer the contents or the instance of group of slices parameter set from other syntax structures already encoded or decoded or present in a bitstream.

In some embodiments of the apparatus said at least one memory stored with code thereon, which when executed by said at least one processor, further causes the apparatus to decode an identifier value indicative of the inferred group of slices parameter sets.

In some embodiments of the apparatus a group of slices parameter set is valid within a particular access unit associated with it.

In some embodiments of the apparatus the group of slices parameter set syntax structure is included in a network abstraction layer unit sequence for a particular access unit, where the sequence is in decoding or bitstream order, and the group of slices parameter set is valid from its appearance location until the end of the access unit.

In some embodiments of the apparatus the group of slices parameter set is valid for more than one access unit.

In some embodiments of the apparatus said at least one memory stored with code thereon, which when executed by said at least one processor, further causes the apparatus to decode many group of slices parameter sets for an access unit.

In some embodiments of the apparatus the group of slices parameter set syntax structure includes an identifier.

In some embodiments of the apparatus said at least one memory stored with code thereon, which when executed by said at least one processor, further causes the apparatus to use the identifier to refer to a particular group of slices parameter set instance.

In some embodiments of the apparatus said at least one memory stored with code thereon, which when executed by said at least one processor, further causes the apparatus to use the identifier to refer to the group of slices from a slice header or another group of slices parameter set.

In some embodiments of the apparatus a predetermined numbering space is used for the identifier.

In some embodiments of the apparatus said at least one memory stored with code thereon, which when executed by said at least one processor, further causes the apparatus to use a group of slices parameter set identifier value for a first group of slices parameter set and subsequently for a second group of slices parameter set, if the first group of slices parameter set is subsequently not referred to by any slice header or group of slices parameter set.

In some embodiments of the apparatus said at least one memory stored with code thereon, which when executed by said at least one processor, further causes the apparatus to decode a repetitive group of slices parameter set syntax structure from a bitstream.

In some embodiments of the apparatus said at least one memory stored with code thereon, which when executed by said at least one processor, further causes the apparatus to identify the group of slices parameter set syntax structure using a bitstream order of group of slices parameter set syntax structures and a pre-defined numbering scheme.

In some embodiments of the apparatus said at least one memory stored with code thereon, which when executed by said at least one processor, further causes the apparatus to decode the set of syntax elements for the group of slices parameter set to obtain at least one of the following:

Syntax elements indicating a scalable layer and/or other scalability features;

Syntax elements indicating a view and/or other multiview features;

Syntax elements related to a particular component type of a multiview video;

Syntax elements related to access unit identification;

Syntax elements related to decoding order;

Syntax elements related to output order;

Syntax elements related to other syntax elements which may stay unchanged for all slices of an access unit;

Syntax elements which may stay unchanged in all slices of a view component;

Syntax elements related to reference picture list modification;

Syntax elements related to a reference picture set used;

Syntax elements related to decoding reference picture marking;

Syntax elements related to prediction weight tables for weighted prediction;

Syntax elements for controlling deblocking filtering;

Syntax elements for controlling adaptive loop filtering;

Syntax elements for controlling sample adaptive offset.

In some embodiments of the apparatus said at least one memory stored with code thereon, which when executed by said at least one processor, further causes the apparatus to perform one or more of the following when decoding the group of slices parameter set:

decode the syntax element set from a group of slices parameter set syntax structure;

determine whether the syntax element set has been included by reference into the group of slices parameter set;

determine whether the syntax element set is indicated to be absent from the group of slices parameter set.

In some embodiments of the apparatus said at least one memory stored with code thereon, which when executed by said at least one processor, further causes the apparatus to decode a syntax element set related to scalable layers from the group of slices parameter set, and decoding a syntax element which stays unchanged in all slices of a view component from the group of slices parameter set.

In some embodiments of the apparatus said at least one memory stored with code thereon, which when executed by said at least one processor, further causes the apparatus to determine whether a syntax element related to reference picture list modification is included by reference in, included as such in, or be absent from the group of slices parameter set syntax structure.

In some embodiments of the apparatus said at least one memory stored with code thereon, which when executed by said at least one processor, further causes the apparatus to decode a group of slices parameter set from a network abstraction layer unit.

In some embodiments of the apparatus said at least one memory stored with code thereon, which when executed by said at least one processor, further causes the apparatus to decode group of slices parameter set NAL units from the bitstream together with coded slice network abstraction layer units.

According to a tenth example there is provided a computer program product including one or more sequences of one or more instructions which, when executed by one or more processors, cause an apparatus to at least perform the following:

decode a coded slice of a coded picture by:

identifying a first location of a first set of syntax elements and a second location of a second set of syntax elements to be used for decoding the coded slice to be one of a slice header or a group of slices parameter set, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decoding syntax elements of the first set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decoding syntax elements of the second set; and decoding the coded slice using the decoded first set of syntax elements and the second set of syntax elements.

In some embodiments the computer program product includes one or more sequences of one or more instructions which, when executed by one or more processors, cause the apparatus to decode at least a subset of syntax elements from the group of slices parameter set.

In some embodiments the computer program product includes one or more sequences of one or more instructions which, when executed by one or more processors, cause the apparatus to infer the contents or the instance of group of slices parameter set from other syntax structures already encoded or decoded or present in a bitstream.

In some embodiments the computer program product includes one or more sequences of one or more instructions which, when executed by one or more processors, cause the apparatus to decode an identifier value indicative of the inferred group of slices parameter sets.

In some embodiments of the computer program product a group of slices parameter set is valid within a particular access unit associated with it.

In some embodiments of the computer program product the group of slices parameter set syntax structure is included in a network abstraction layer unit sequence for a particular access unit, where the sequence is in decoding or bitstream order, and the group of slices parameter set is valid from its appearance location until the end of the access unit.

In some embodiments of the computer program product the group of slices parameter set is valid for more than one access unit.

In some embodiments the computer program product includes one or more sequences of one or more instructions which, when executed by one or more processors, cause the apparatus to decode many group of slices parameter sets for an access unit.

In some embodiments of the computer program product the group of slices parameter set syntax structure includes an identifier.

In some embodiments the computer program product includes one or more sequences of one or more instructions which, when executed by one or more processors, cause the apparatus to use the identifier to refer to a particular group of slices parameter set instance.

In some embodiments the computer program product includes one or more sequences of one or more instructions which, when executed by one or more processors, cause the apparatus to use the identifier to refer to the group of slices from a slice header or another group of slices parameter set.

In some embodiments of the computer program product a predetermined numbering space is used for the identifier.

In some embodiments the computer program product includes one or more sequences of one or more instructions which, when executed by one or more processors, cause the apparatus to use a group of slices parameter set identifier value for a first group of slices parameter set and subsequently for a second group of slices parameter set, if the first group of slices parameter set is subsequently not referred to by any slice header or group of slices parameter set.

In some embodiments the computer program product includes one or more sequences of one or more instructions which, when executed by one or more processors, cause the apparatus to decode a repetitive group of slices parameter set syntax structure from a bitstream.

In some embodiments the computer program product includes one or more sequences of one or more instructions which, when executed by one or more processors, cause the apparatus to identify the group of slices parameter set syntax structure using a bitstream order of group of slices parameter set syntax structures and a pre-defined numbering scheme.

In some embodiments the computer program product includes one or more sequences of one or more instructions which, when executed by one or more processors, cause the apparatus to decode the set of syntax elements for the group of slices parameter set to obtain at least one of the following:

Syntax elements indicating a scalable layer and/or other scalability features;

Syntax elements indicating a view and/or other multiview features;

Syntax elements related to a particular component type of a multiview video;

Syntax elements related to access unit identification;

Syntax elements related to decoding order;

Syntax elements related to output order;

Syntax elements related to other syntax elements which may stay unchanged for all slices of an access unit;

Syntax elements which may stay unchanged in all slices of a view component;

Syntax elements related to reference picture list modification;

Syntax elements related to a reference picture set used;

Syntax elements related to decoding reference picture marking;

Syntax elements related to prediction weight tables for weighted prediction;

Syntax elements for controlling deblocking filtering;

Syntax elements for controlling adaptive loop filtering;

Syntax elements for controlling sample adaptive offset.

In some embodiments the computer program product includes one or more sequences of one or more instructions which, when executed by one or more processors, cause the apparatus to perform one or more of the following when decoding the group of slices parameter set:

decoding the syntax element set from a group of slices parameter set syntax structure;

determining whether the syntax element set has been included by reference into the group of slices parameter set;

determining whether the syntax element set is indicated to be absent from the group of slices parameter set.

In some embodiments the computer program product includes one or more sequences of one or more instructions which, when executed by one or more processors, cause the apparatus to decode a syntax element set related to scalable layers from the group of slices parameter set, and decoding a syntax element which stays unchanged in all slices of a view component from the group of slices parameter set.

In some embodiments the computer program product includes one or more sequences of one or more instructions which, when executed by one or more processors, cause the apparatus to determine whether a syntax element related to reference picture list modification is included by reference in, included as such in, or be absent from the group of slices parameter set syntax structure.

In some embodiments the computer program product includes one or more sequences of one or more instructions which, when executed by one or more processors, cause the apparatus to decode a group of slices parameter set from a network abstraction layer unit.

In some embodiments the computer program product includes one or more sequences of one or more instructions which, when executed by one or more processors, cause the apparatus to decode group of slices parameter set NAL units from the bitstream together with coded slice network abstraction layer units.

According to an eleventh example there is provided a method comprising:

means for decoding a coded slice of a coded picture, the decoding comprising:

means for identifying a first location of a first set of syntax elements and a second location of a second set of syntax elements to be used for decoding the coded slice to be one of a slice header or a group of slices parameter set, means for decoding the first set of syntax elements and the second set of syntax elements to be used for decoding the coded slice, comprising:

means for decoding a first indication of an inclusion of the respective first set from a third group of slices parameter set, and as a response to the first indication being indicative of the third group of slices parameter set, decoding a respective first set of syntax elements from the third group of slices parameter set; or if the first indication is not indicative of the third group of slices parameter set, decoding syntax elements of the first set; and means for decoding a second indication of an inclusion of the respective second set from a fourth group of slices parameter set, and as response to the first indication being indicative of the fourth group of slices parameter set, decoding a respective first set of syntax elements from the fourth group of slices parameter set; or if the second indication is not indicative of the fourth group of slices parameter set, decoding syntax elements of the second set; and means for decoding the coded slice using the decoded first set of syntax elements and the second set of syntax elements.

What is claimed is:

1. A method comprising:
encoding an uncompressed picture into a coded picture comprising a slice, the encoding comprising:
classifying syntax elements for the slice into a first set and a second set;
determining syntax element values for the first set and the second set; and
encoding the first set selectively in a first group of slices parameter set or a slice header, wherein said encoding of the first set comprises one of the following:
providing an indication of an inclusion of the respective first set from another group of slices parameter set; or
encoding the syntax element values of the first set;
and
encoding the second set selectively in a second group of slices parameter set or the slice header, wherein said encoding of the second set comprises one of the following:
providing an indication of an inclusion of the respective second set from another group of slices parameter set; or
encoding the syntax element values of the second set,
wherein the method further comprises forming at least one group of slices parameter set from the slice header of a texture view component of a base view.

2. The method according to claim 1 further comprising inferring the contents or the instance of group of slices parameter set from other syntax structures already encoded or decoded or present in a bitstream.

3. A method comprising,
encoding an uncompressed picture into a coded picture comprising a slice, the encoding comprising:
classifying syntax elements for the slice into a first set and a second set;
determining syntax element values for the first set and the second set; and
encoding the first set selectively in a first group of slices parameter set or a slice header, wherein said encoding of the first set comprises one of the following:
providing an indication of an inclusion of the respective first set from another group of slices parameter set; or
encoding the syntax element values of the first set; and encoding the second set selectively in a second group of slices parameter set or the slice header, wherein said encoding of the second set comprises one of the following:

providing an indication of an inclusion of the respective second set from another group of slices parameter set; or encoding the syntax element values of the second set, wherein a group of slices parameter set is valid within a particular access unit associated with the group of slices parameter set, wherein the group of slices parameter set syntax structure is included in a network abstraction layer unit sequence for the particular access unit, where the sequence is in decoding or bitstream order, and the group of slices parameter set is valid from its appearance location until the end of the access unit.

4. The method according to claim 1 comprising determining whether at least a subset of syntax element values in a slice header to be coded would be the same in a subsequent slice header, and if so encoding the group of slices parameter set in a bitstream.

5. The method according to claim 1 comprising using a group of slices parameter set identifier values for the first group of slices parameter set and subsequently for the second group of slices parameter set, if the first group of slices parameter set is subsequently not referred to by any slice header or group of slices parameter set.

6. The method according to claim 1 comprising identifying the group of slices parameter set syntax structure using a bitstream order of group of slices parameter set syntax structures and a pre-defined numbering scheme.

7. The method according to claim 1 comprising forming the set of syntax elements for the group of slices parameter set from at least one of the following:

syntax elements indicating a scalable layer and/or other scalability features;

syntax elements indicating a view and/or other multiview features;

syntax elements related to a particular component type of a multiview video;

syntax elements related to access unit identification;

syntax elements related to decoding order;

syntax elements related to output order;

syntax elements related to other syntax elements which may stay unchanged for all slices of an access unit;

syntax elements which may stay unchanged in all slices of a view component;

syntax elements related to reference picture list modification;

syntax elements related to a reference picture set used;

syntax elements related to decoding reference picture marking;

syntax elements related to prediction weight tables for weighted prediction;

syntax elements for controlling deblocking filtering;

syntax elements for controlling adaptive loop filtering; or syntax elements for controlling sample adaptive offset.

8. A computer program product including a non-transitory media containing one or more sequences of one or more instructions which, when executed by one or more processors, cause an apparatus to at least perform the method of independent claim 1.

9. An apparatus comprising at least one processor and at least one memory including computer program code, the at least one memory and the computer program code configured to, with the at least one processor, cause the apparatus to:

classify syntax elements for a slice of a coded picture comprising into a first set and a second set;

determine syntax element values for the first set and the second set; and encode the first set selectively in a first group of slices parameter set or a slice header comprising one of the following:

providing an indication of an inclusion of the respective first set from another group of slices parameter set; or encoding the syntax element values of the first set; and encode the second set selectively in a second group of slices parameter set or the slice header comprising one of the following:

providing an indication of an inclusion of the respective second set from another group of slices parameter set; or encoding the syntax element values of the second set, wherein the at least one memory and the computer program code are further configured to, with the at least one processor, cause the apparatus to form at least one group of slices parameter set from the slice header of a texture view component of a base view.

10. The apparatus according to claim 9, wherein the at least one memory and the computer program code are further configured to, with the at least one processor, cause the apparatus to infer the contents or the instance of group of slices parameter set from other syntax structures already encoded or decoded or present in a bitstream.

11. A method comprising:

decoding a coded slice of a coded picture, the decoding comprising:

identifying a first location of a first set of syntax elements and a second location of a second set of syntax elements to be used for decoding the coded slice to be one of a slice header or first and second group of slices parameter sets, decoding the first set of syntax elements and the second set of syntax elements to be used for decoding the coded slice, comprising:

decoding a first indication of an inclusion of the respective first set from a third group of slices parameter set, and as a response to the first indication being indicative of the third group of slices parameter set, decoding a respective first set of syntax elements from the third group of slices parameter set; and decoding a second indication of an inclusion of the respective second set from a fourth group of slices parameter set, and as response to the first indication being indicative of the fourth group of slices parameter set, decoding a respective first set of syntax elements from the fourth group of slices parameter set; and decoding the coded slice using the decoded first set and the second set of syntax elements, wherein a group of slices parameter set is valid within a particular access unit associated with the group of parameter set, wherein the group of slices parameter set syntax structure is included in a network abstraction layer unit sequence for the particular access unit, where the sequence is in decoding or bitstream order, and the group of slices parameter set is valid from its appearance location until the end of the access unit.

12. A method according to claim 11, further comprising:
in an instance in which the first indication is not indicative of the third group of slices parameter set, decoding syntax elements of the first set; and
in an instance in which if the first indication is not indicative of the fourth group of slices parameter set, decoding syntax elements of the second set.

13. The method according to claim 11, further comprising inferring the contents or the instance of group of slices parameter set from other syntax structures already encoded or decoded or present in a bitstream.

14. A computer program product including a non-transitory media containing one or more sequences of one or more instructions which, when executed by one or more processors, cause an apparatus to at least perform the method of independent claim 11.

15. An apparatus comprising at least one processor and at least one memory including computer program code, the at least one memory and the computer program code configured to, with the at least one processor, cause the apparatus to:
decode a coded slice of a coded picture by:
identifying a first location of a first set of syntax elements and a second location of a second set of syntax elements to be used for decoding the coded slice to be one of a slice header or first and second group of slices parameter sets,
decoding the first set of syntax elements and the second set of syntax elements to be used for decoding the coded slice, comprising:
decoding a first indication of an inclusion of the respective first set from a third group of slices parameter set, and as a response to the first indication being indicative of the third group of slices parameter set, decoding a respective first set of syntax elements from the third group of slices parameter set; and
decoding a second indication of an inclusion of the respective second set from a fourth group of slices parameter set, and as response to the first indication being indicative of the fourth group of slices parameter set, decoding a respective first set of syntax elements from the fourth group of slices parameter set; and
decoding the coded slice using the decoded first set and the second set of syntax elements,
wherein a group of slices parameter set is valid within a particular access unit associated with the group of slices parameter set, wherein the group of slices parameter set syntax structure is included in a network abstraction layer unit sequence for the particular access unit, where the sequence is in decoding or bitstream order, and the group of slices parameter set is valid from its appearance location until the end of the access unit.

16. The apparatus according to claim 15, wherein the at least one memory and the computer program code are further configured to, with the at least one processor, cause the apparatus to:
in an instance in which the first indication is not indicative of the third group of slices parameter set, decode syntax elements of the first set; and
in an instance in which the second indication is not indicative of the fourth group of slices parameter set, decode syntax elements of the second set.

17. The apparatus according to claim 15, wherein the at least one memory and the computer program code are further configured to, with the at least one processor, cause the apparatus to infer the contents or the instance of group of slices parameter set from other syntax structures already encoded or decoded or present in a bitstream.

18. A computer program product including a non-transitory media containing one or more sequences of one or more instructions which, when executed by one or more processors, cause an apparatus to at least perform the method of independent claim 3.

19. An apparatus comprising at least one processor and at least one memory including computer program code, the at least one memory and the computer program code configured to, with the at least one processor, cause the apparatus to:
classify syntax elements for a slice of a coded picture comprising into a first set and a second set;
determine syntax element values for the first set and the second set; and
encode the first set selectively in a first group of slices parameter set or a slice header comprising one of the following:
providing an indication of an inclusion of the respective first set from another group of slices parameter set; or
encoding the syntax element values of the first set; and
encode the second set selectively in a second group of slices parameter set or the slice header comprising one of the following:
providing an indication of an inclusion of the respective second set from another group of slices parameter set; or
encoding the syntax element values of the second set,
wherein a group of slices parameter set is valid within a particular access unit associated with the group of slices parameter set, wherein the group of slices parameter set syntax structure is included in a network abstraction layer unit sequence for the particular access unit, where the sequence is in decoding or bitstream order, and the group of slices parameter set is valid from its appearance location until the end of the access unit.

* * * * *

UNITED STATES PATENT AND TRADEMARK OFFICE
CERTIFICATE OF CORRECTION

| | | |
|---|---|---|
| PATENT NO. | : 9,479,775 B2 | Page 1 of 1 |
| APPLICATION NO. | : 13/757529 | |
| DATED | : October 25, 2016 | |
| INVENTOR(S) | : Hannuksela | |

It is certified that error appears in the above-identified patent and that said Letters Patent is hereby corrected as shown below:

In the Claims

Column 72,
Line 30, "deter mine" should read --determine--.

Signed and Sealed this
Eighth Day of August, 2017

Joseph Matal
*Performing the Functions and Duties of the
Under Secretary of Commerce for Intellectual Property and
Director of the United States Patent and Trademark Office*